(12) United States Patent
Ichikawa et al.

(10) Patent No.: US 10,202,045 B2
(45) Date of Patent: Feb. 12, 2019

(54) VEHICLE WITH SHIELDED POWER RECEIVING COIL

(71) Applicants: TOYOTA JIDOSHA KABUSHIKI KAISHA, Toyota-shi, Aichi (JP); Shinji Ichikawa, Toyota-shi, Aichi-ken (JP); Toru Nakamura, Toyota-shi, Aichi-ken (JP); Masaya Ishida, Nagakute-shi, Aichi-ken (JP); Yoshiyuki Hattori, Nagakute-shi, Aichi-ken (JP); Toshiaki Watanabe, Owariasahi-shi, Aichi-ken (JP); Takashi Kojima, Nagoya-shi, Aichi-ken (JP)

(72) Inventors: Shinji Ichikawa, Toyota (JP); Toru Nakamura, Toyota (JP); Masaya Ishida, Nagakute (JP); Yoshiyuki Hattori, Nagakute (JP); Toshiaki Watanabe, Owariasahi (JP); Takashi Kojima, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 394 days.

(21) Appl. No.: 14/372,368

(22) PCT Filed: Jan. 15, 2013

(86) PCT No.: PCT/IB2013/000046
§ 371 (c)(1),
(2) Date: Jul. 15, 2014

(87) PCT Pub. No.: WO2013/108108
PCT Pub. Date: Jul. 25, 2013

(65) Prior Publication Data
US 2015/0008877 A1    Jan. 8, 2015

(30) Foreign Application Priority Data

Jan. 16, 2012 (JP) .................. 2012-005905

(51) Int. Cl.
*B60L 11/00* (2006.01)
*B60L 11/18* (2006.01)
(Continued)

(52) U.S. Cl.
CPC .......... *B60L 11/182* (2013.01); *H01F 27/288* (2013.01); *H01F 27/2871* (2013.01);
(Continued)

(58) Field of Classification Search
CPC .. H01F 27/2871; H01F 27/362; H01F 27/365; B32B 2307/212; E04B 2001/925;
(Continued)

(56) References Cited

U.S. PATENT DOCUMENTS 4,794,318 A * 12/1988 Maschek ................. H01F 38/22
323/358
2002/0180108 A1 * 12/2002 Koshiba ............ B29C 45/14778
264/328.1
(Continued)

FOREIGN PATENT DOCUMENTS

EP        2773019 A1 *  9/2014  ............. H02J 5/005
JP     2010252498 A    11/2010
(Continued)

*Primary Examiner* — Drew A Dunn
*Assistant Examiner* — Harry O'Neill-Becerril
(74) *Attorney, Agent, or Firm* — Sughrue Mion, PLLC

(57) ABSTRACT

A vehicle includes a power receiving portion that contactlessly receives electric power from a power transmitting portion provided outside the vehicle and includes a shield member that is arranged around the power receiving portion in the same plane as a plane in which the power receiving portion is arranged, wherein the shield member includes a first shield region having a high shielding function and a second shield region having a shielding function lower than that of the first shield region at a position around the power receiving portion.

22 Claims, 13 Drawing Sheets

(51) Int. Cl.
*H02J 50/70* (2016.01)
*H02J 50/12* (2016.01)
*H02J 50/10* (2016.01)
*H01F 27/28* (2006.01)
*H01F 38/14* (2006.01)
*H01F 27/36* (2006.01)
*H04B 5/00* (2006.01)
*H02J 7/02* (2016.01)

(52) U.S. Cl.
CPC ........... *H01F 27/36* (2013.01); *H01F 27/362* (2013.01); *H01F 38/14* (2013.01); *H02J 7/025* (2013.01); *H02J 50/10* (2016.02); *H02J 50/12* (2016.02); *H02J 50/70* (2016.02); *H04B 5/0037* (2013.01); *B60L 2270/147* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .... E04B 2002/7468; F16C 33/82; G11B 5/11; G11B 5/115; G11B 5/315; G11B 5/3912; H01J 2211/446; H01L 23/552; H01L 2924/3025; H01Q 1/526; H01R 13/658–13/6599; H04N 1/00994; H05K 9/0081–9/0092
USPC ............. 320/108; 336/84 M, 84 R; 174/391; 257/659, 660; 428/692.1, 137; 244/159.1, 171.7, 121; 315/85; 720/650; 361/220, 816, 818; 307/91
See application file for complete search history.

(56) References Cited

U.S. PATENT DOCUMENTS

| | | | |
|---|---|---|---|
| 2005/0230788 A1* | 10/2005 | Kato | G11C 11/16 257/659 |
| 2010/0065352 A1 | 3/2010 | Ichikawa | |
| 2010/0253333 A1* | 10/2010 | Zhai | G01R 33/34046 324/307 |
| 2011/0100980 A1* | 5/2011 | Kitaizumi | H05B 6/1245 219/624 |
| 2011/0285349 A1* | 11/2011 | Widmer | B60L 11/182 320/108 |
| 2012/0153894 A1* | 6/2012 | Widmer | H04B 5/0037 320/108 |

FOREIGN PATENT DOCUMENTS

| | | |
|---|---|---|
| JP | 2011-045189 A | 3/2011 |
| JP | 2011049230 A | 3/2011 |
| JP | 2011-072188 A | 4/2011 |
| WO | 2011/112795 A1 | 9/2011 |
| WO | 2011/114208 A2 | 9/2011 |
| WO | 2013/073051 A1 | 5/2013 |

* cited by examiner

13: rectifier
14: DC/DC converter
15: battery
16: power control unit
17: motor unit
18: vehicle ECU
22: high-frequency power driver
26: control unit

VEHICLE WITH SHIELDED POWER RECEIVING COIL

BACKGROUND OF THE INVENTION

1. Field of the Invention

The invention relates to a vehicle that includes a power receiving portion that uses a power transfer system.

2. Description of Related Art

In recent years, hybrid vehicles, electric vehicles, and the like, that drive drive wheels with the use of electric power from a battery, or the like, become a focus of attention in consideration of an environment.

Particularly, in recent years, in the above-described electromotive vehicles equipped with a battery, wireless charging through which the battery is contactlessly chargeable without using a plug, or the like, becomes a focus of attention. Then, various contactless charging systems have been suggested recently.

A power transfer system that uses a contactless charging system is, for example, described in Japanese Patent Application Publication No. 2011-072188 (JP 2011-072188 A) and Japanese Patent Application Publication No. 2011-045189 (JP 2011-045189 A).

In these power transfer systems, a power receiving portion is mounted at a vehicle side. In order to actually mount a power receiving portion on a vehicle, it is required to take a leakage of an electromagnetic wave from the power receiving portion into consideration. The vehicle includes a shield member in order to suppress a leakage of an electromagnetic wave.

However, the shield member is determined on the basis of the shape of the power receiving portion, and a design of the shield member, focusing on a shielding function associated with the shape of the vehicle, is not performed.

SUMMARY OF THE INVENTION

The invention provides a vehicle that, when a power receiving portion is mounted on a vehicle, includes a shield member that has a shielding function that reflects the shape of the vehicle.

An aspect of the invention provides a vehicle that includes: a power receiving portion that contactlessly receives electric power from a power transmitting portion provided outside the vehicle; and a shield member. The shield member is arranged around the power receiving portion in the same plane as a plane in which the power receiving portion is arranged, and includes a first shield region having a high shielding function and a second shield region having a shielding function lower than that of the first shield region at a position around the power receiving portion.

In the vehicle, the shield member may be arranged such that the first shield region includes a position having a minimum distance from the power receiving portion to an outer frame of a face on which the power receiving portion is installed.

In the vehicle, the vehicle may have a long-side direction and a short-side direction perpendicular to the long-side direction in plan view in a state where the vehicle is stopped in a horizontal plane, and the shield member may be arranged such that the first shield region includes an area in the short-side direction with respect to the power receiving portion and the second shield region includes an area in the long-side direction with respect to the power receiving portion.

In the vehicle, the shield member may be located at a center position in the long-side direction of the vehicle and at a center position in the short-side direction of the vehicle. Alternatively, the shield member may be located at a position other than a center portion in the short-side direction of the vehicle or the shield member may be located at a position other than a center portion in the long-side direction of the vehicle.

In the vehicle, the shield member may include a flange portion that extends outward of the vehicle, and the flange portion located in the first shield region may have a higher shielding function than the flange portion located in the second shield region.

At this time, the flange portion may have an elliptical shape in plan view. Alternatively, the flange portion may have a substantially square shape in plan view.

In the vehicle, the shield member may include an extended portion extended in a vertical direction of the vehicle, and a shielding function of the first shield region in which the extended portion is located may be higher than a shielding function of the second shield region in which the extended portion is not located.

In the vehicle, the shield member may have a member that has a shielding function and that is stuck to the first shield region, and a shielding function of the first shield region in which the member is located may be higher than a shielding function of the second shield region in which the member is not located.

Furthermore, the vehicle may include a vehicle-mounted device, and the shield member may be arranged such that the vehicle-mounted device faces the second shield region.

In the vehicle, the power receiving portion may be mounted on a lower side of an under body of the vehicle.

In the vehicle, a difference between a natural frequency of the power transmitting portion and a natural frequency of the power receiving portion may be smaller than or equal to 10% of the natural frequency of the power receiving portion.

In the vehicle, a coupling coefficient between the power receiving portion and the power transmitting portion may be smaller than or equal to 0.1.

In the vehicle, the power, receiving portion may receive electric power from the power transmitting portion through at least one of a magnetic field that is formed between the power receiving portion and the power transmitting portion and that oscillates at a predetermined frequency and an electric field that is formed between the power receiving portion and the power transmitting portion and that oscillates at the predetermined frequency.

According to the aspect of the invention, when the power receiving portion is mounted on the vehicle, it is possible to provide the vehicle that includes the shield member that has a shielding function that reflects the shape of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
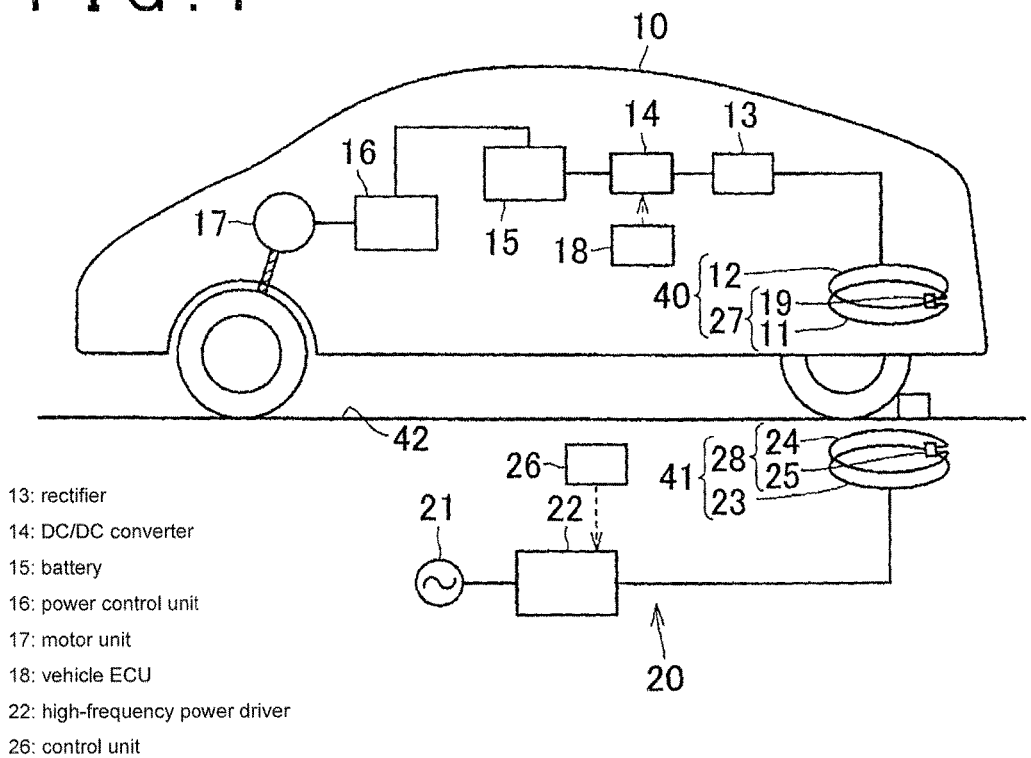
FIG. 1 is a view that schematically illustrates a power transmitting device and a vehicle, on which a power receiving device is mounted, in a power transfer system according to a first embodiment of the invention.

A power transmitting device, a vehicle on which a power receiving device is mounted, and a power transfer system according to embodiments of the invention will be described below with reference to the accompanying drawings. In the following embodiments, when the number, the amount, and the like, are referred to, the scope of the invention is not limited to those number, amount, and the like, unless otherwise specified. Like reference numerals denote the same or corresponding components, and the overlap description may not be repeated. The scope of the invention also encompasses a combination of the components described in the respective embodiments where appropriate.

A vehicle on which a power receiving device of a power transfer system according to the first embodiment is mounted will be described with reference to FIG. 1. FIG. 1 is a view that schematically illustrates a power transmitting device and the vehicle, on which the power receiving device is mounted, in the power transfer system according to the first embodiment.

The power transfer system according to the first embodiment includes an electromotive vehicle 10 and an external power supply device 20. The electromotive vehicle 10 includes the power receiving device 40. The external power supply device 20 includes the power transmitting device 41. When the electromotive vehicle 10 is stopped at a predetermined position of a parking space 42 in which the power transmitting device 41 is provided, the power receiving device 40 of the electromotive vehicle 10 receives electric power from the power transmitting device 41.

A wheel block or a line that indicates a parking position and a parking area is provided in the parking space 42 so that the electromotive vehicle 10 is stopped at a predetermined position.

The external power supply device 20 includes a high-frequency power driver 22, a control unit 26 and the power transmitting device 41. The high-frequency power driver 22 is connected to an alternating-current power supply 21. The control unit 26 executes drive control over the high-frequency power driver 22, and the like. The power transmitting device 41 is connected to the high-frequency power driver 22. The power transmitting device 41 includes a power transmitting portion 28 and an electromagnetic induction coil 23. The power transmitting portion 28 includes a resonance coil 24 and a capacitor 25 that is connected to the resonance coil 24. The electromagnetic induction coil 23 is electrically connected to the high-frequency power driver 22. Note that, in the example shown in FIG. 1, the capacitor 25 is provided; however, the capacitor 25 is not necessarily an indispensable component.

The power transmitting portion 28 includes an electrical circuit that is formed of the inductance of the resonance coil 24, the stray capacitance of the resonance coil 24 and the capacitance of the capacitor 25.

The electromotive vehicle 10 includes the power receiving device 40, a rectifier 13, a DC/DC converter 14, a battery 15, a power control unit (PCU) 16, a motor unit 17 and a vehicle electronic control unit (ECU) 18. The rectifier 13 is connected to the power receiving device 40. The DC/DC converter 14 is connected to the rectifier 13. The battery 15 is connected to the DC/DC converter 14. The motor unit 17 is connected to the power control unit 16. The vehicle ECU 18 executes drive control over the DC/DC converter 14, the power control unit 16, and the like. The electromotive vehicle 10 according to the present embodiment is a hybrid vehicle that includes an engine (not shown). Instead, as long as the electromotive vehicle 10 is driven by a motor, the electromotive vehicle 10 may be an electric vehicle or a fuel cell vehicle.

The rectifier 13 is connected to an electromagnetic induction coil 12, converts alternating current, which is supplied from the electromagnetic induction coil 12, to direct current, and supplies the direct current to the DC/DC converter 14.

The DC/DC converter 14 adjusts the voltage of the direct current supplied from the rectifier 13, and supplies the adjusted voltage to the battery 15. The DC/DC converter 14 is not an indispensable component and may be omitted. In this case, by providing a matching transformer for matching impedance in the external power supply device 20 between the power transmitting device 41 and the high-frequency power driver 22, it is possible to substitute the matching transformer for the DC/DC converter 14.

The power control unit 16 includes a converter and an inverter. The converter is connected to the battery 15. The inverter is connected to the converter. The converter adjusts (steps up) direct current that is supplied from the battery 15, and supplies the adjusted direct current to the inverter. The inverter converts the direct current, which is supplied from the converter, to alternating current, and supplies the alternating current to the motor unit 17.

For example, a three-phase alternating-current motor, or the like, is employed as the motor unit 17. The motor unit 17 is driven by alternating current that is supplied from the inverter of the power control unit 16.

When the electromotive vehicle 10 is a hybrid vehicle, the electromotive vehicle 10 further includes an engine. In addition, the motor unit 17 includes a motor generator that mainly functions as a generator and a motor generator that mainly functions as an electric motor.

The power receiving device 40 includes a power receiving portion 27 and the electromagnetic induction coil 12. The power receiving portion 27 includes a resonance coil 11 and a capacitor 19. The resonance coil 11 has a stray capacitance. The power receiving portion 27 has an electrical circuit that is formed of the inductance of the resonance coil 11 and the capacitances of the resonance coil 11 and capacitor 19. The capacitor 19 is not an indispensable component and may be omitted.

In the power transfer system according to the present embodiment, the difference between the natural frequency of the power transmitting portion 28 and the natural frequency of the power receiving portion 27 is smaller than or equal to 10% of the natural frequency of the power receiving portion 27 or power transmitting portion 28. By setting the natural frequency of each of the power transmitting portion 28 and the power receiving portion 27 within the above range, it is possible to increase the power transfer efficiency.

On the other hand, when the difference in natural frequency is larger than 10% of the natural frequency of the power receiving portion 27 or power transmitting portion 28, the power transfer efficiency becomes lower than 10%, so there occurs an inconvenience, such as an increase in a charging time for charging the battery 15.

Here, the natural frequency of the power transmitting portion 28, in the case where no capacitor 25 is provided, means an oscillation frequency in the case where the electrical circuit formed of the inductance of the resonance coil 24 and the capacitance of the resonance coil 24 freely oscillates. In the case where the capacitor 25 is provided, the natural frequency of the power transmitting portion 28 means an oscillation frequency in the case where the electrical circuit formed of the capacitances of the resonance coil 24 and capacitor 25 and the inductance of the resonance coil 24 freely oscillates. In the above-described electrical circuits, the natural frequency at the time when braking force and electric resistance are set to zero or substantially zero is called the resonance frequency of the power transmitting portion 28.

Similarly, the natural frequency of the power receiving portion 27, in the case where no capacitor 19 is provided, means an oscillation frequency in the case where the electrical circuit formed of the inductance of the resonance coil 11 and the capacitance of the resonance coil 11 freely oscillates. In the case where the capacitor 19 is provided, the natural frequency of the power receiving portion 27 means an oscillation frequency in the case where the electrical circuit formed of the capacitances of the resonance coil 11 and capacitor 19 and the inductance of the resonance coil 11 freely oscillates. In the above-described electrical circuits, the natural frequency at the time when braking force and electric resistance are set to zero or substantially zero is called the resonance frequency of the power receiving portion 27.

Figure 2:
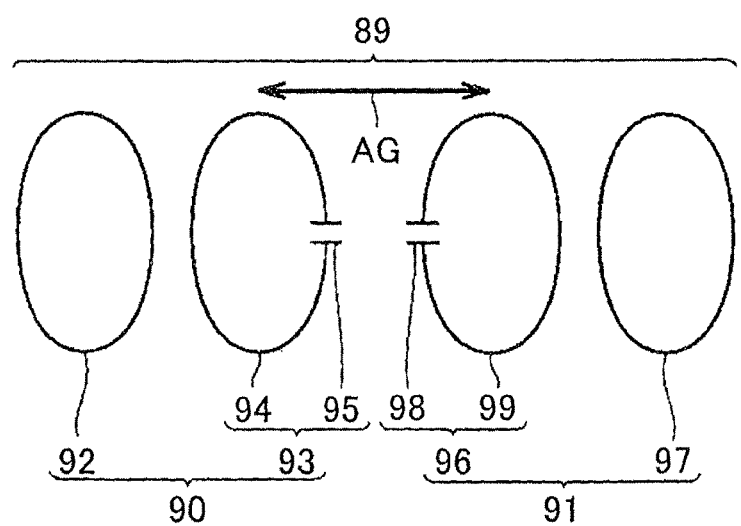
FIG. 2 is a view that shows a simulation model of the power transfer system according to the first embodiment of the invention.

Results of simulation that analyzes the correlation between a difference in natural frequency and a power transfer efficiency will be described with reference to FIG. 2 and FIG. 3. FIG. 2 shows a simulation model of a power transfer system. The power transfer system 89 includes a power transmitting device 90 and a power receiving device 91. The power transmitting device 90 includes an electromagnetic induction coil 92 and a power transmitting portion 93. The power transmitting portion 93 includes a resonance coil 94 and a capacitor 95 provided in the resonance coil 94.

The power receiving device 91 includes a power receiving portion 96 and an electromagnetic induction coil 97. The power receiving portion 96 includes a resonance coil 99 and a capacitor 98 connected to the resonance coil 99.

The inductance of the resonance coil 94 is set to Lt, and the capacitance of the capacitor 95 is set to C1. The inductance of the resonance coil 99 is set to Lr, and the capacitance of the capacitor 98 is set to C2. When the parameters are set in this way, the natural frequency f1 of the power transmitting portion 93 is expressed by the following mathematical expression (1), and the natural frequency f2 of the power receiving portion 96 is expressed by the following mathematical expression (2).

$$f1 = 1/\{2\pi(Lt \times C1)^{1/2}\} \qquad (1)$$

$$f2 = 1/\{2\pi(Lr \times C2)^{1/2}\} \qquad (2)$$

Figure 3:
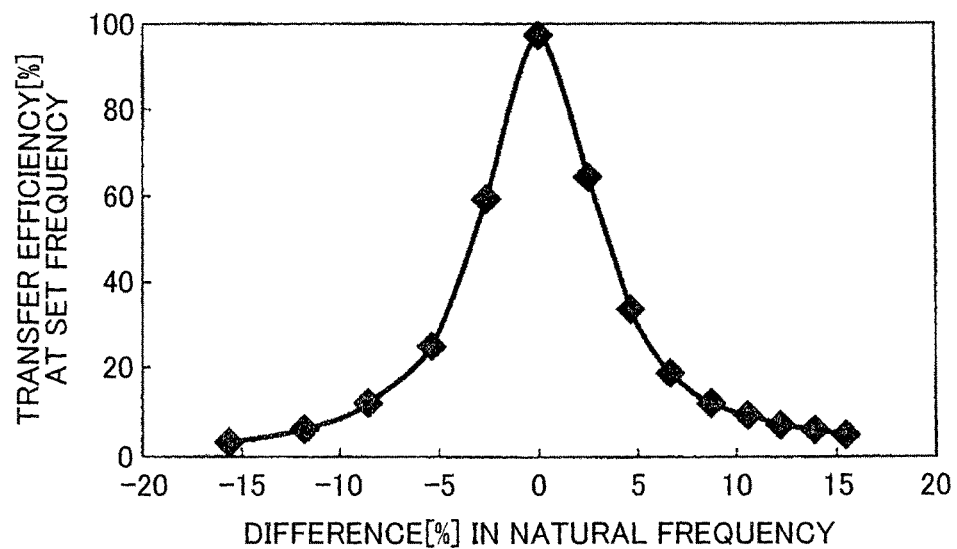
FIG. 3 is a graph that shows simulation results of the simulation model shown in FIG. 2.

Here, in the case where the inductance Lr and the capacitances C1 and C2 are fixed and only the inductance Lt is varied, the correlation between, a difference in natural frequency between the power transmitting portion 93 and the power receiving portion 96 and a power transfer efficiency is shown in FIG. 3. Note that, in this simulation, a relative positional relationship between the resonance coil 94 and the resonance coil 99 is fixed, and, furthermore, the frequency of current that is supplied to the power transmitting portion 93 is constant.

As shown in FIG. 3, the abscissa axis represents a difference (%) in natural frequency, and the ordinate axis represents a transfer efficiency (%) at a set frequency. The difference (%) in natural frequency is expressed by the following mathematical expression (3).

$$\text{Difference (\%) in Natural Frequency} = \{(f1-f2)/f2\} \times 100 \quad (3)$$

As is apparent from FIG. 3, when the difference (%) in natural frequency is ±0%, the power transfer efficiency is close to 100%. When the difference (%) in natural frequency is ±5%, the power transfer efficiency is 40%. When the difference (%) in natural frequency is ±10%, the power transfer efficiency is 10%. When the difference (%) in natural frequency is ±15%, the power transfer efficiency is 5%. That is, it is found that, by setting the natural frequency of each of the power transmitting portion and power receiving portion such that the absolute value of the difference (%) in natural frequency (difference in natural frequency) falls at or below 10% of the natural frequency of the power receiving portion 96, it is possible to increase the power transfer efficiency. Furthermore, it is found that, by setting the natural frequency of each of the power transmitting portion and power receiving portion such that the absolute value of the difference (%) in natural frequency is smaller than or equal to 5% of the natural frequency of the power receiving portion 96, it is possible to further increase the power transfer efficiency. Note that the electromagnetic field analyzation software application (JMAG (trademark): produced by JSOL Corporation) is employed as a simulation software application.

Next, the operation of the power transfer system according to the present embodiment will be described. As shown in FIG. 1, alternating-current power is supplied from the high-frequency power driver 22 to the electromagnetic induction coil 23. When a predetermined alternating current flows through the electromagnetic induction coil 23, alternating current also flows through the resonance coil 24 due to electromagnetic induction. At this time, electric power is supplied to the electromagnetic induction coil 23 such that the frequency of alternating current flowing through the resonance coil 24 becomes a predetermined frequency.

When current having the predetermined frequency flows through the resonance coil 24, an electromagnetic field that oscillates at the predetermined frequency is formed around the resonance coil 24.

The resonance coil 11 is arranged within a predetermined range from the resonance coil 24. The resonance coil 11 receives electric power from the electromagnetic field formed around the resonance coil 24.

In the present embodiment, a so-called helical coil is employed as each of the resonance coil 11 and the resonance coil 24. Therefore, a magnetic field that oscillates at the predetermined frequency is mainly formed around the resonance coil 24, and the resonance coil 11 receives electric power from the magnetic field.

Here, the magnetic field having the predetermined frequency, formed around the resonance coil 24, will be described. The "magnetic field having the predetermined frequency" typically correlates with the power transfer efficiency and the frequency of current that is supplied to the resonance coil 24. Then, first, the correlation between the power transfer efficiency and the frequency of current that is supplied to the resonance coil 24 will be described. The power transfer efficiency at the time when electric power is transferred from the resonance coil 24 to the resonance coil 11 varies depending on various factors, such as a distance between the resonance coil 24 and the resonance coil 11. For example, the natural frequency (resonance frequency) of the power transmitting portion 28 and power receiving portion 27 is set to f0, the frequency of current supplied to the resonance coil 24 is f3, and the air gap between the resonance coil 11 and the resonance coil 24 is set to AG.

Figure 4:
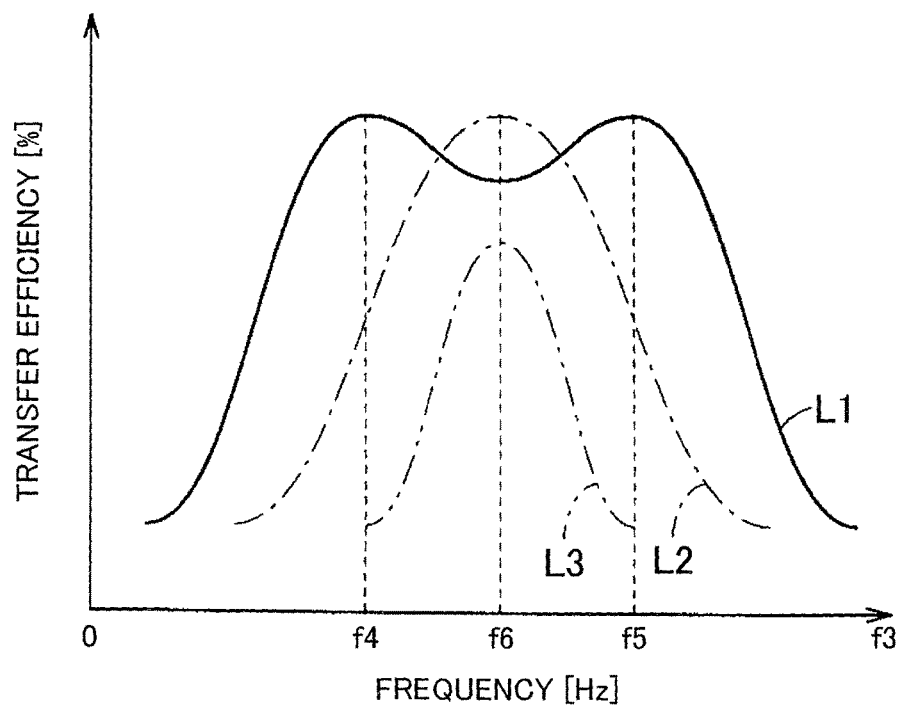
FIG. 4 is a graph that shows the correlation between a power transfer efficiency and a frequency of current that is supplied to a resonance coil at the time when an air gap is changed in a state where a natural frequency is fixed in the simulation model shown in FIG. 2.

FIG. 4 is a graph that shows the correlation between a power transfer efficiency and the frequency f3 of current that is supplied to the resonance coil 24 at the time when the air gap AG is varied in a state where the natural frequency f0 is fixed.

In the graph shown in FIG. 4, the abscissa axis represents the frequency f3 of current that is supplied to the resonance coil 24, and the ordinate axis represents a power transfer efficiency (%). An efficiency curve L1 schematically shows the correlation between a power transfer efficiency and the frequency f3 of current that is supplied to the resonance coil 24 when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, the power transfer efficiency becomes a peak when the frequency of current that is supplied to the resonance coil 24 is f6. When the air gap AG is further increased from the state of the efficiency curve L2, the peak of the power transfer efficiency reduces as indicated by an efficiency curve L3.

For example, the following first and second methods are conceivable as a method of improving the power transfer efficiency. In the first method, by varying the capacitances of the capacitor 25 and capacitor 19 in accordance with the air gap AG while the frequency of current that is supplied to the resonance coil 24 shown in FIG. 1 is constant, the characteristic of power transfer efficiency between the power transmitting portion 28 and the power receiving portion 27 is varied. Specifically, the capacitances of the capacitor 25 and capacitor 19 are adjusted such that the power transfer efficiency becomes a peak in a state where the frequency of current that is supplied to the resonance coil 24 is constant. In this method, irrespective of the size of the air gap AG, the frequency of current flowing through the resonance coil 24 and the resonance coil 11 is constant. As a method of varying the characteristic of power transfer efficiency, a method of utilizing a matching transformer provided between the power transmitting device 41 and the high-frequency power driver 22, a method of utilizing the converter 14, or the like, may be employed.

In addition, in the second method, the frequency of current that is supplied to the resonance coil 24 is adjusted on the basis of the size of the air gap AG. For example, in FIG. 4, when the power transfer characteristic becomes the efficiency curve L1, current having the frequency f4 or the frequency f5 is supplied to the resonance coil 24. Then, when the frequency characteristic becomes the efficiency curve L2 or L3, current having the frequency f6 is supplied to the resonance coil 24. In this case, the frequency of current flowing through the resonance coil 24 and the resonance coil 11 is varied in accordance with the size of the air gap AG.

In the first, method, the frequency of current flowing through the resonance coil 24 is a fixed constant frequency, and, in the second method, the frequency of current flowing through the resonance coil 24 is a frequency that appropriately varies with the air gap AG. Through the first method, the second method, or the like, current having the predetermined frequency set such that the power transfer efficiency is high is supplied to the resonance coil 24. When current having the predetermined frequency flows through the resonance coil 24, a magnetic field (electromagnetic field) that oscillates at the predetermined frequency is formed around the resonance coil 24. The power receiving portion 27 receives electric power from the power transmitting portion 28 through the magnetic field that is formed between the power receiving portion 27 and the power transmitting portion 28 and that oscillates at the predetermined frequency. Thus, the "magnetic field that oscillates at the predetermined frequency" is not necessarily a magnetic field having a fixed frequency. Note that, in the above-described embodiment, the frequency of current that is supplied to the resonance coil 24 is set by focusing on the air gap AG; however, the power transfer efficiency also varies on the basis of other factors, such as a deviation in the horizontal direction between the resonance coil 24 and the resonance coil 11, so the frequency of current that is supplied to the resonance coil 24 may possibly be adjusted on the basis of those other factors.

In the present embodiment, the description is made on the example in which a helical coil is employed as each resonance coil; however, when a meander line antenna, or the like, is employed as each resonance coil, current having a predetermined frequency flows through the resonance coil 24, and, therefore, an electric field having the predetermined frequency is formed around the resonance coil 24. Then, through the electric field, power is transferred between the power transmitting portion 28 and the power receiving portion 27.

Figure 5:
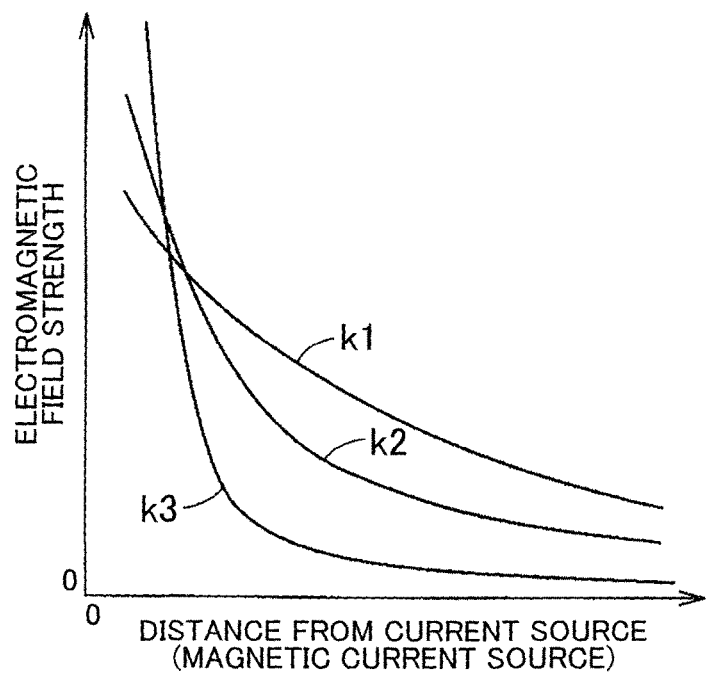
FIG. 5 is a graph that shows the correlation between a distance from a current source (magnetic current source) and a strength of an electromagnetic field in the simulation model shown in FIG. 2.

In the power transfer system according to the present embodiment, a near field (evanescent field) in which the static electromagnetic field of an electromagnetic field is dominant is utilized. By so doing, power transmitting and power receiving efficiencies are improved. FIG. 5 is a graph that shows the correlation between a distance from a current source (magnetic current source) and a strength of an electromagnetic field. As shown in FIG. 5, the electromagnetic field includes three components. A curve k1 is a component inversely proportional to a distance from a wave source, and is referred to as radiation electromagnetic field. A curve k2 is a component inversely proportional to the square of a distance from a wave source, and is referred to as induction electromagnetic field. In addition, a curve k3 is a component inversely proportional to the cube of a distance from a wave source, and is referred to as static electromagnetic field. Where the wavelength of the electromagnetic field is λ, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic wave steeply reduces with a distance from a wave source. In the power transfer system according to the present embodiment, transfer of energy (electric power) is performed by utilizing the near field (evanescent field) in which the static electromagnetic field is dominant. That is, by resonating the power transmitting portion 28 and the power receiving portion 27 (for example, a pair of LC resonance coils) respectively having close natural frequencies in the near field in which the static electromagnetic field is dominant, energy (electric power) is transferred from the power transmitting portion 28 to the power receiving portion 27. This static electromagnetic field does not propagate energy to a far place. Thus, in comparison with an electromagnetic wave that transfers energy (electric power) by the radiation electromagnetic field that propagates energy to a far place, the resonance method is able to transmit electric power with a less energy loss.

In this way, in the power transfer system according to the present embodiment, by resonating the power transmitting portion 28 and the power receiving portion 27 through the electromagnetic field, electric power is transmitted from the power transmitting device 41 to the power receiving device 40. Then, a coupling coefficient κ between the power transmitting portion 28 and the power receiving portion 27 is desirably smaller than or equal to 0.1. The coupling coefficient κ is not limited to this value. The coupling coefficient κ can be various values at which power transfer is appropriate. Generally, in power transfer that utilizes electromagnetic induction, the coupling coefficient κ between the power transmitting portion and the power receiving portion is close to 1.0.

Coupling between the power transmitting portion 28 and the power receiving portion 27 in power transfer according to the present embodiment is, for example, called "magnetic resonance coupling", "magnetic field resonance coupling", "electromagnetic field resonance coupling" or "electric field resonance coupling".

The electromagnetic field resonance coupling means coupling that includes the magnetic resonance coupling, the magnetic field resonance coupling and the electric field resonance coupling.

Coil-shaped antennas are employed as the resonance coil 24 of the power transmitting portion 28 and the resonance coil 11 of the power receiving portion 27, described in the specification. Therefore, the power transmitting portion 28 and the power receiving portion 27 are mainly coupled through a magnetic field, and the power transmitting portion 28 and the power receiving portion 27 are coupled through magnetic resonance or magnetic field resonance.

Note that an antenna, such as a meander line antenna, may be employed as each of the resonance coils 24 and 11. In this case, the power transmitting portion 28 and the power receiving portion 27 are mainly coupled through an electric field. At this time, the power transmitting portion 28 and the power receiving portion 27 are coupled through electric field resonance.

Figure 6:
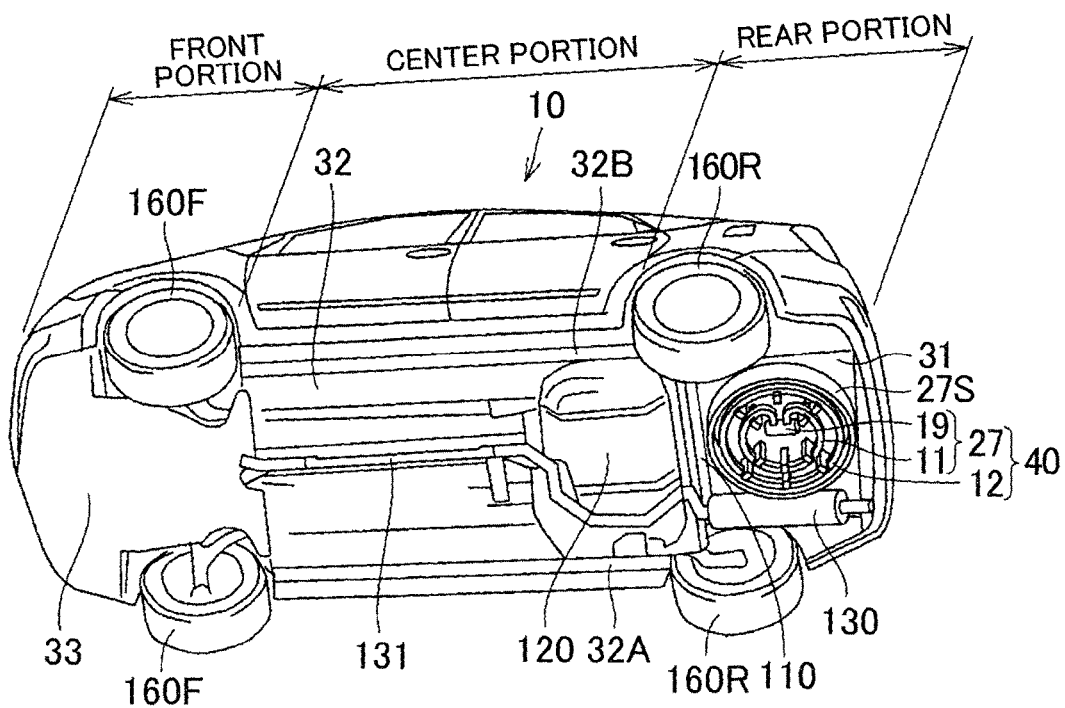
FIG. 6 is a bottom view of the vehicle, which shows an example of the power receiving device mounted on the vehicle shown in FIG. 1.
Figure 7:
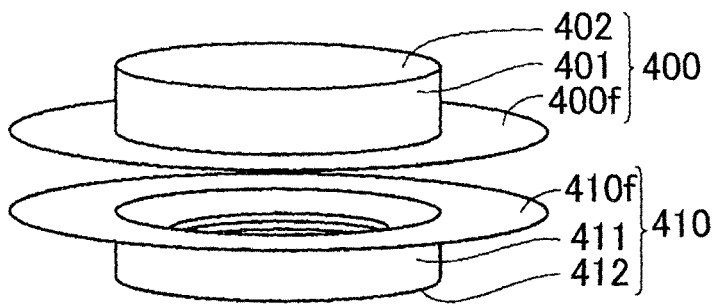
FIG. 7 is a schematic view that shows an example of shield members that are used in the power transfer system shown in FIG. 1.
Figure 8:
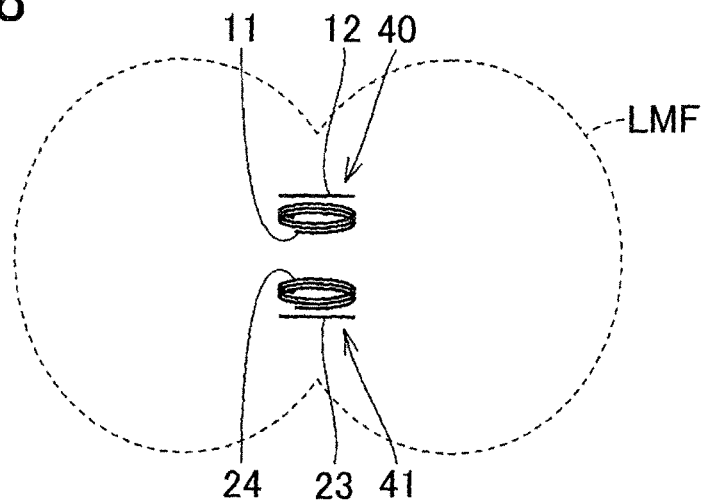
FIG. 8 is a schematic view that shows an extension of a leakage electromagnetic wave in the case where no shield member is provided in the power transfer system.
Figure 9:
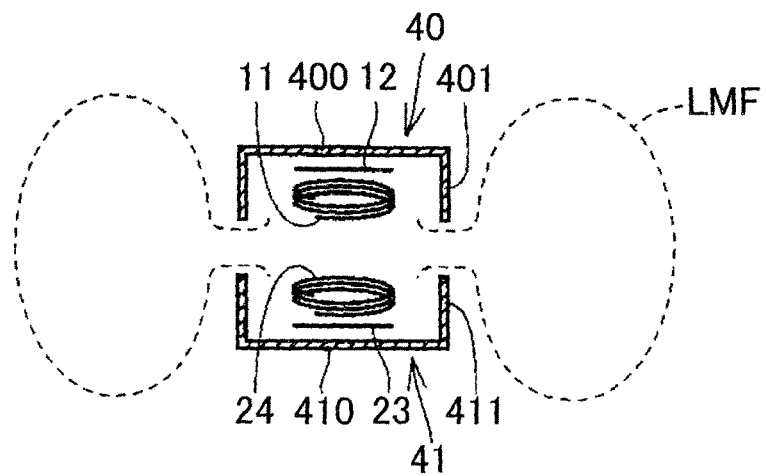
FIG. 9 is a schematic view that shows a shielding effect in the case where the shield members are provided in the power transfer system.
Figure 10:
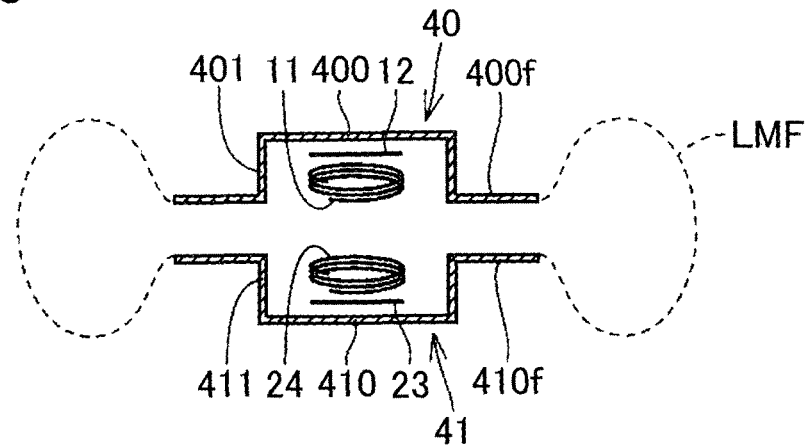
FIG. 10 is a schematic view that shows a shielding effect in the case where the shield members shown in FIG. 7 are provided in the power transfer system.
Figure 11:
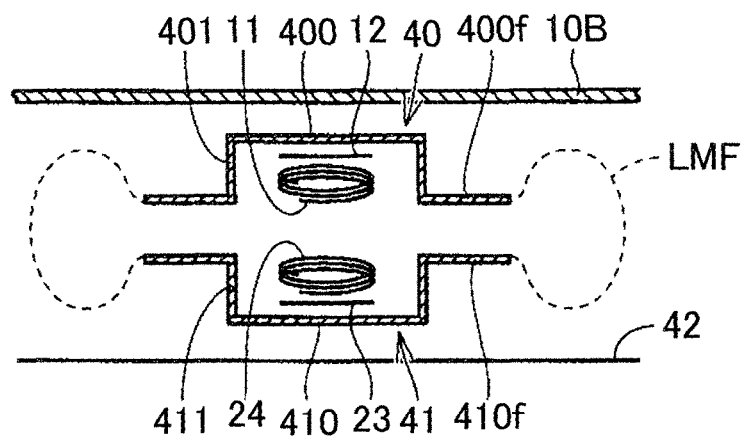
FIG. 11 is a view that shows the arrangement of an undercover of the vehicle and the shield members shown in FIG. 7.

Shield members that are used in the power transfer system according to the first embodiment and a shielding effect in the case where the shield members are used will be described with reference to FIG. 6 to FIG. 11. FIG. 6 is a bottom view of the vehicle, which shows an example of the power receiving device mounted on the electromotive vehicle 10. FIG. 7 is a schematic view that shows an example of the shield members that are used in the power transfer system. FIG. 8 is a schematic view that shows an extension of a leakage electromagnetic wave in the case where no shield member is provided in the power transfer system. FIG. 9 is a schematic view that shows a shielding effect in the case where the shield members are provided in the power transfer system. FIG. 10 is a schematic view that shows a shielding effect in the case where the shield members shown in FIG. 7 are provided in the power transfer system. FIG. 11 is a view that shows the arrangement of an undercover of the electromotive vehicle 10 and the shield members shown in FIG. 7.

A shield means a function of, when an electromagnetic wave has reached the shield member, inhibiting a travel of the electromagnetic wave across the shield member, and specifically inhibits a travel of an electromagnetic wave by converting an incoming electromagnetic wave to an eddy current.

As shown in FIG. 6, a region from the front end of the electromotive vehicle 10 to the rear end of each front wheel tire 160F is termed front portion, a region from the rear end of each front wheel tire 160F to the front end of each rear wheel tire 160R is termed center portion, and a region from the rear end of each rear wheel tire 160R to the rear end of the electromotive vehicle 10 is termed rear portion. The same applies to the following description.

Figure 12:
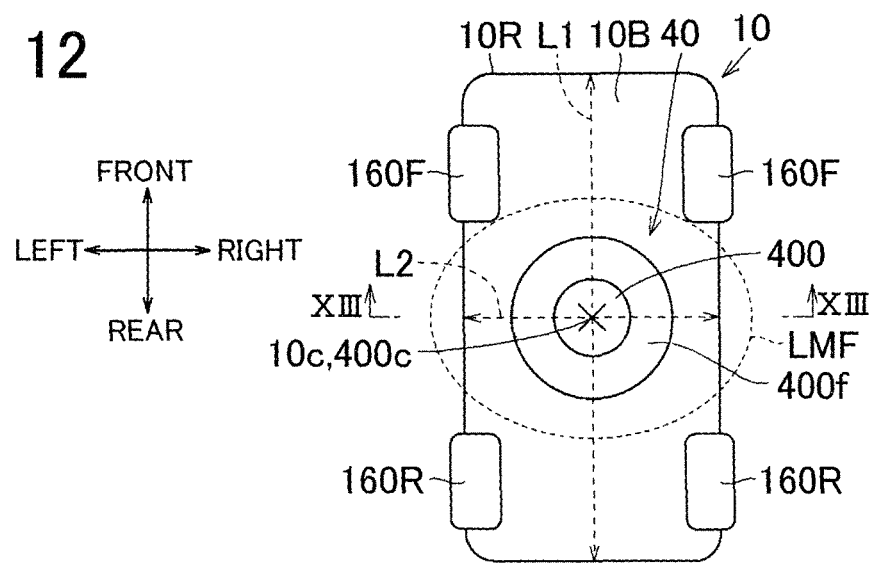
FIG. 12 is a schematic view (plan view) that shows a relationship among the shape of the vehicle, the shield member mounted at the center portion of the vehicle and a leakage electromagnetic wave.

As shown in FIG. 12 described later, the forward travel side of the electromotive vehicle 10 is termed front side, the reverse travel side is termed rear side, the front side-to-rear side direction is termed longitudinal direction, the left side when facing toward the forward travel direction is termed left side, the right side when facing toward the forward travel direction is termed right side, and the right side-to-left side direction is termed transverse direction. Furthermore, in a state where the electromotive vehicle 10 is stopped in a horizontal plane, the vertically upper side is termed upper side, and the vertically lower side is termed lower side. The same applies to the following description.

As shown in FIG. 6, in the electromotive vehicle 10 according to the present embodiment, the power receiving device 40 is arranged at the rear portion of the electromotive vehicle 10. The power receiving device 40 includes the power receiving portion 27 and the circular electromagnetic induction coil 12. A configuration that the electromagnetic induction coil 12 is not provided may be employed. The power receiving portion 27 includes the circular resonance coil 11 and the capacitor 19. The resonance coil 11 is fixed to the lower side of a rear floor panel 31 with the use of a support member made of resin. The rear floor panel 31 is an under panel.

The electromagnetic induction coil 12 is fixed to the rear floor panel 31 with the use of a support member made of resin. In the present embodiment, the electromagnetic induction coil 12 is arranged radially outward of the resonance coil 11. However, the arrangement of the resonance coil 11 and the electromagnetic induction coil 12 is not limited to this arrangement. A position at which the power receiving device 40 is mounted may be a position that is the lower side of a center floor panel 32 at the center portion or a position that is the lower side of an engine under floor panel 33.

A shield member 400 is provided around the power receiving device 40 that includes the power receiving portion 27 and the circular electromagnetic induction coil 12. The shield member 400 is arranged around the power receiving portion 27 in the same plane as a plane in which the power receiving device 40 is provided.

Figure 13:
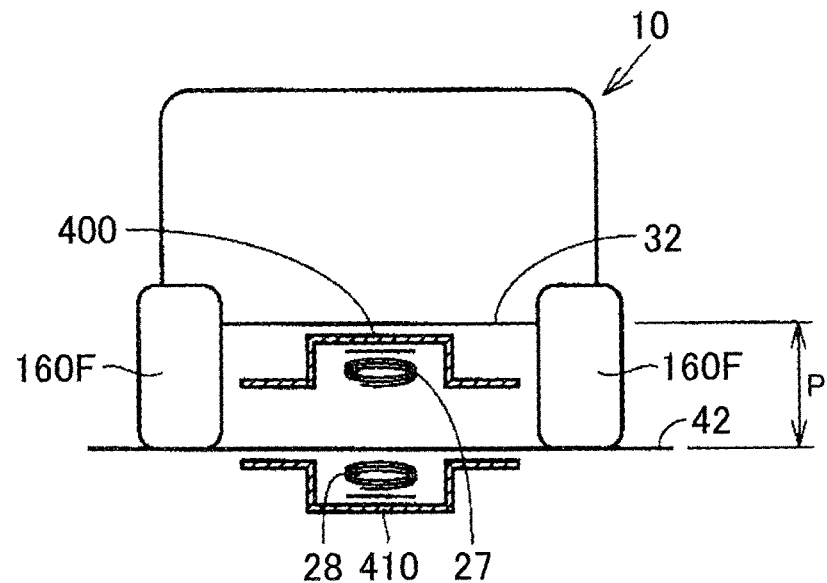
FIG. 13 is a cross-sectional view taken along the line XIII-XIII in FIG. 12.

Here, a plane means, as shown in FIG. 13 described later, an imaginary space that horizontally spreads and that has the thickness of a height P between a horizontal plane 42 and the rear floor panel 31 in the case where the electromotive vehicle 10 is placed in the horizontal plane 42, and the same plane means that the power receiving portion 27, the electromagnetic induction coil 12 and the shield member 400 are located in the imaginary space that horizontally spreads and that has the thickness of the height P.

As shown in FIG. 7, the power receiving device-side shield member 400 includes a circular cylindrical portion 401 and a bottom portion 402. The cylindrical portion 401 surrounds the radially outer side of the electromagnetic induction coil 12 and the resonance coil 11. The bottom portion 402 is located on an opposite side of the electromagnetic induction coil 12 and the resonance coil 11 with respect to the power transmitting device. An annular flange portion 400f is provided at a side of the circular cylindrical portion 401, adjacent to the power transmitting device. The annular flange portion 400f extends outward of the electromotive vehicle 10. A configuration of the shield member 400, which does not include the cylindrical portion 401, may also be employed.

The cylindrical portion 401, the bottom portion 402 and the flange portion 400f are made of a shield material that has an electromagnetic wave shielding effect. For example, the shield material may be a metal material, such as copper. Alternatively, the above portions 401, 402 and 400f may be formed of a low-cost member and then a cloth, a sponge, or the like, having an electromagnetic wave shielding effect may be stuck to the inner surfaces or outer surfaces of the portions 401, 402 and 400f. The bottom portion 402 having a shielding function is not an indispensable component.

Similarly, the power transmitting device-side shield member 410 includes a circular cylindrical portion 411 and a bottom portion 412. The cylindrical portion 411 surrounds the radially outer side of the electromagnetic induction coil 23 and the resonance coil 24. The bottom portion 412 is located on an opposite side of the electromagnetic induction coil 23 and the resonance coil 24 with respect to the power receiving device. An annular flange portion 410f is provided at a side of the circular cylindrical portion 411, adjacent to the power receiving device. The annular flange portion 410f extends outward of the electromotive vehicle 10.

The cylindrical portion 411, the bottom portion 412 and the flange portion 410f are made of a shield material that has an electromagnetic wave shielding effect. For example, the shield material may be a metal material, such as copper. Alternatively, the above portions 411, 412 and 410f may be formed of a low-cost member and then a cloth, a sponge, or the like, having an electromagnetic wave shielding effect may be stuck to the inner surfaces or outer surfaces of the portions 411, 412 and 410f. The bottom portion 412 having a shielding function is not an indispensable component.

As shown in FIG. 8, when the shield member is neither provided for the power transmitting device 41 nor provided for the power receiving device 40, a leakage electromagnetic field LMF extends significantly as shown in the drawing. As shown in FIG. 9, when the shield members respectively having no flange portions 400f and 410f are respectively used for the power receiving device 40 and the power transmitting device 41, it is possible to suppress an extension of the leakage electromagnetic field LMF.

However, it is not possible to suppress a secondary extension of the leakage electromagnetic field LMF as shown in the drawing on the basis of eddy currents that are respectively generated at the end portions of the cylindrical portions 401 and 411. Then, as shown in FIG. 10, by respectively providing the shield members 400 and 410 with the flange portions 400f and 410f as shown in FIG. 7, it is possible to suppress a secondary extension of a leakage electromagnetic field.

As shown in FIG. 11, when the power receiving device 40 is mounted on the lower side of an under panel 10B, such as the rear floor panel 31 of the electromotive vehicle 10, the under panel 10B made of a conductor also functions as a shield. As a result, it is possible to suppress an extension of a leakage electromagnetic field with the use of the shield member 400, including the flange portion 400f, and the under panel 10B.

Figure 14:
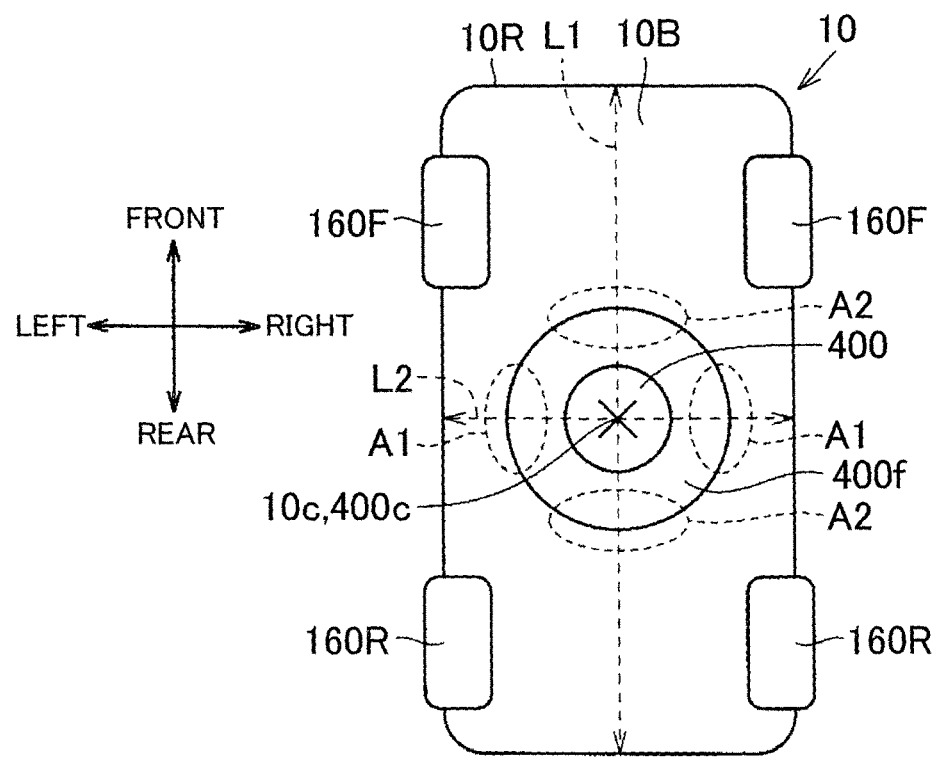
FIG. 14 is a view that shows a study of a shield member, focusing on a shielding function associated with the shape of the vehicle.

The relationship among the outer shape of the electromotive vehicle 10, the shape of the shield member 400 that includes the flange portion 400f and a leakage electromagnetic field in the case where the power receiving device 40 is mounted on the electromotive vehicle 10 will be studied with reference to FIG. 12 to FIG. 14. FIG. 12 is a schematic view (plan view) that shows the relationship among the shape of the vehicle, the shield member mounted at the center portion of the vehicle and a leakage electromagnetic field. FIG. 13 is a cross-sectional view taken along the line XIII-XIII in FIG. 12. FIG. 14 is a view that shows a study of the shield member, focusing on a shielding function associated with the shape of the vehicle.

As shown in FIG. 12, the under panel 10B means the rear floor panel 31, the center floor panel 32 and the engine under floor panel 33 (see FIG. 6). An outer frame (outer shape profile) 10R of the electromotive vehicle 10 shown in FIG. 12 is an outer shape in plan view of the under panel 10B in a state where the electromotive vehicle 10 is stopped in a horizontal plane. The same applies to the following description.

The shield member 400 has a circular shape in plan view, and the flange portion 400f has an annular shape that is concentric with the center of the cylindrical portion 401. Here, the center of the shield member 400 is a center 400c of the cylindrical portion 401. A center 10c of the electromotive vehicle 10 is a center position in the transverse direction of the outer frame (outer shape profile) 10R and is a center position between the rear end of each front wheel tire 160F and the front end of each rear wheel tire 160R. The center 400c of the shield member 400 is located so as to match with the center 10c of the electromotive vehicle 10.

In this case, the under panel 10B of the electromotive vehicle 10 has such a structure that the length (L1) in the longitudinal direction is longer than the length (L2) in the transverse direction (L1>L2). Thus, the shielding effect of the under panel 10B is higher in the longitudinal direction than in the transverse direction. The shield member 400 and the flange portion 400f each have a circular shape, so the shielding effect in the same circle is the same.

As a result, as indicated by the dotted line in FIG. 12, an extension of the leakage electromagnetic field LMF is larger in the transverse direction of the under panel 10B of the electromotive vehicle 10 than in the longitudinal direction of the under panel 10B of the electromotive vehicle 10, and, in the transverse direction of the electromotive vehicle 10, part of the leakage electromagnetic field LMF may protrude outward beyond the outer frame (outer shape profile) 10R of the under panel 10B at each of the right side and the left side.

As shown in FIG. 14, it is found that the shielding function of the flange portion 400f is increased in areas that are surrounded by A1 located in the transverse direction of the electromotive vehicle 10 and the shielding function of the flange portion 400f may be decreased in areas that are surrounded by A2 located in the longitudinal direction of the electromotive vehicle 10.

Figure 15:
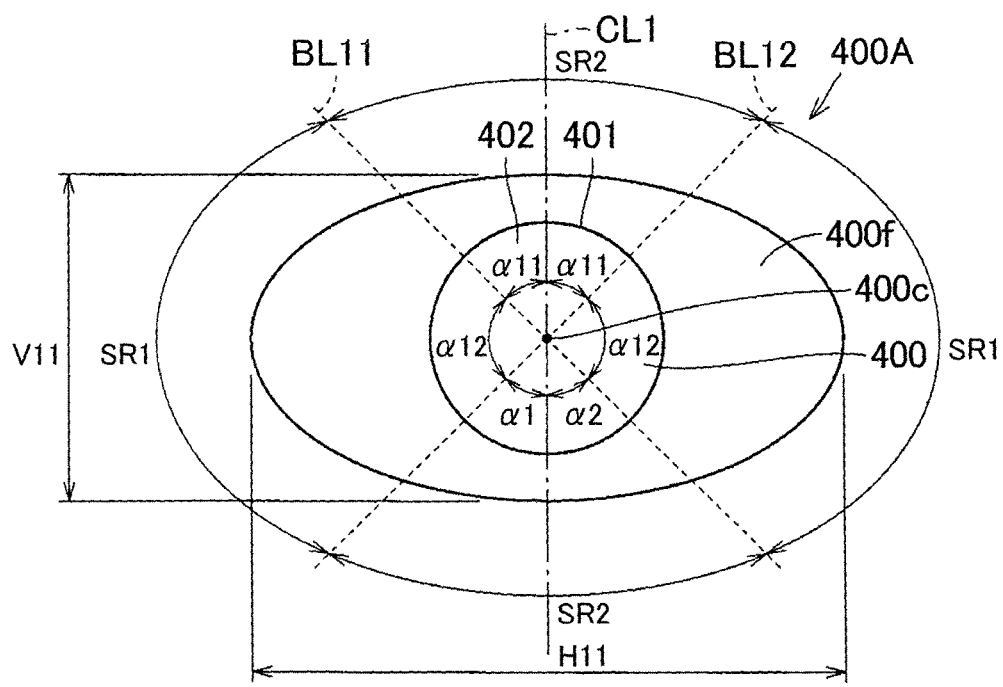
FIG. 15 is a view (plan view) that shows an example shape of the shield member according to the first embodiment.
Figure 16:
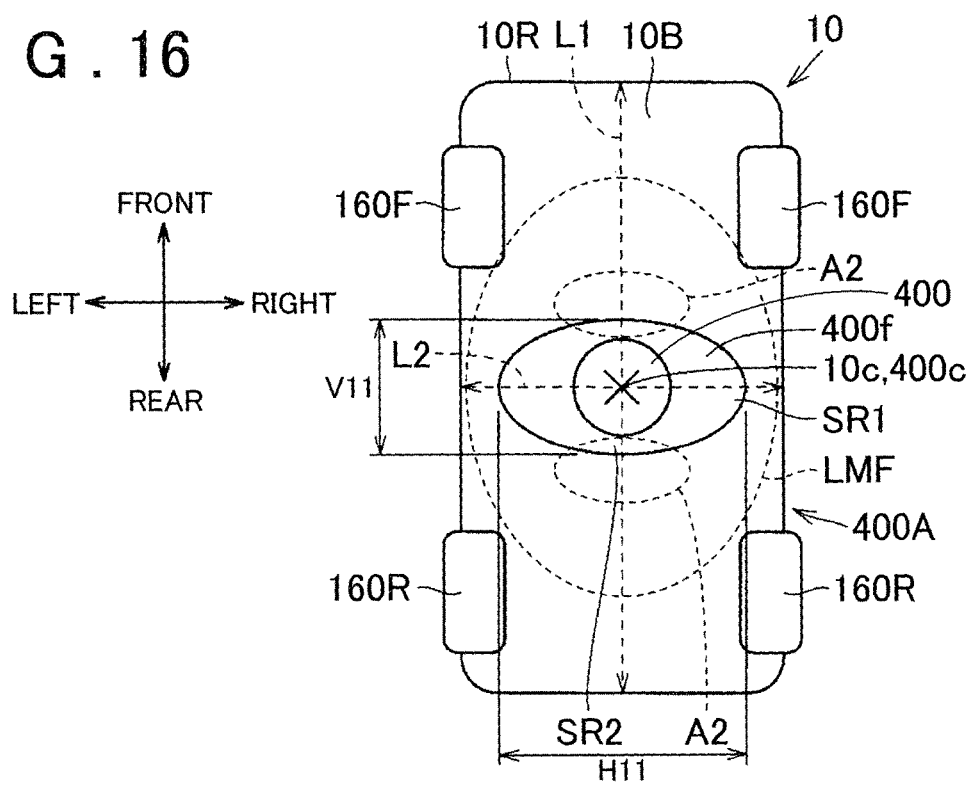
FIG. 16 is a plan view that shows an extension of a leakage electromagnetic field in the case where the shield member according to the first embodiment is mounted on the vehicle.

The shape of the flange portion 400f according to the first embodiment will be described with reference to FIG. 15 and FIG. 16. FIG. 15 is a view (plan view) that shows an example shape of a shield member according to the present embodiment. FIG. 16 is a plan view that shows an extension of the leakage electromagnetic field in the case where the shield member according to the present embodiment is mounted on the vehicle.

As shown in FIG. 15, in the present embodiment, the shield member 400A includes first shield regions SR1 and second shield regions SR2 at a peripheral position that surrounds the power receiving portion 27. The first shield regions SR1 have a high shielding function. The second shield regions SR2 have a shielding function lower than that of each of the first shield regions SR1.

The cylindrical portion 401 has a circular shape; whereas the shape of the flange portion 400f has a substantially elliptical shape that is longer in the transverse direction than in the longitudinal direction (long side H11, short side V11). When the shield member 400A is partitioned by boundary lines BL11 and BL12 that respectively incline rightward and leftward by $[\alpha 11]°$ with respect to a center line CL1 that extends in the longitudinal direction of the electromotive vehicle 10, the regions located in the transverse direction each are defined as the first shield region SR1, and the regions located in the longitudinal direction each are defined as the second shield region SR2.

In the present embodiment, $[\alpha 11]°$ is set to 45°. As a result, in FIG. 15, $[\alpha 12]°$ becomes 90°. The partitions (angles) of the regions are just illustrative and are not limited to these partitions.

The flange portion 400f is formed in an elliptical shape that is long in the transverse direction, the amount of the flange portion 400f extending radially outward from the cylindrical portion 401 is set such that the extended amount of each first shield region SR1 is larger than the extended amount of each second shield region SR2. As a result, at a peripheral position that surrounds the power receiving portion 27, each first shield region SR1 has a higher shielding function than each second shield region SR2.

As shown in FIG. 16, the shield member 400A having the above shape is mounted such that the center 10c of the electromotive vehicle 10 coincides with the center 400c of the shield member 400A. By so doing, the shield member 400A is arranged such that the first shield regions SR1 include a position (L2/2) having a minimum distance from the power receiving portion 27 to the outer frame (outer shape profile) 10R at the vehicle body outer side of a face on which the power receiving portion 27 is installed. That is, the long side H11 of the flange portion 400f is aligned in the transverse direction, and the short side V11 of the flange portion 400f is aligned in the longitudinal direction. In the present embodiment, the center 10c of the electromotive vehicle 10 is located at the position L2/2. The same applies to the following description.

When the power receiving portion 27 is arranged on the under panel, the outer frame of the under panel corresponds to the outer frame (outer shape profile) 10R at the vehicle body outer side. The same applies to the following description.

The electromotive vehicle 10 includes the longitudinal long-side direction and the transverse short-side direction perpendicular to the long-side direction in plan view in a state where the electromotive vehicle 10 is stopped in a horizontal plane. The shield member 400A is arranged with respect to the electromotive vehicle 10 such that the first shield regions SR1 include areas in the short-side direction with respect to the power receiving portion 27 and the second shield regions SR2 include areas in the long-side direction with respect to the power receiving portion 27.

Thus, as shown in FIG. 16, the shielding effect in the transverse direction of the electromotive vehicle 10 is increased by the shield member 400A. By so doing, it is possible to suppress an extension of the leakage electromagnetic field LMF outward from the outer frame (outer shape profile) 10R of the under panel 10B.

On the other hand, the shielding effect of the shield member 400A is reduced in the longitudinal direction of the electromotive vehicle 10. By so doing, the leakage electromagnetic field LMF in the longitudinal direction is extended; however, the under panel 10B has a sufficient length in the longitudinal direction, so it is possible to absorb the influence of the leakage electromagnetic field LMF using the under panel 10B as a shield member.

In this way, with the shield member 400A according to the present embodiment, when the power receiving portion 27 is mounted on the electromotive vehicle 10, it is possible to mount the shield member 400A having a shielding function that reflects the shape of the under panel 10B that is the shape of the electromotive vehicle 10. As a result, it is possible to appropriately suppress the leakage electromagnetic field, and it is possible to reduce the weight and size of the shield member 400A by optimizing the shape of the shield member 400A.

Figure 17:
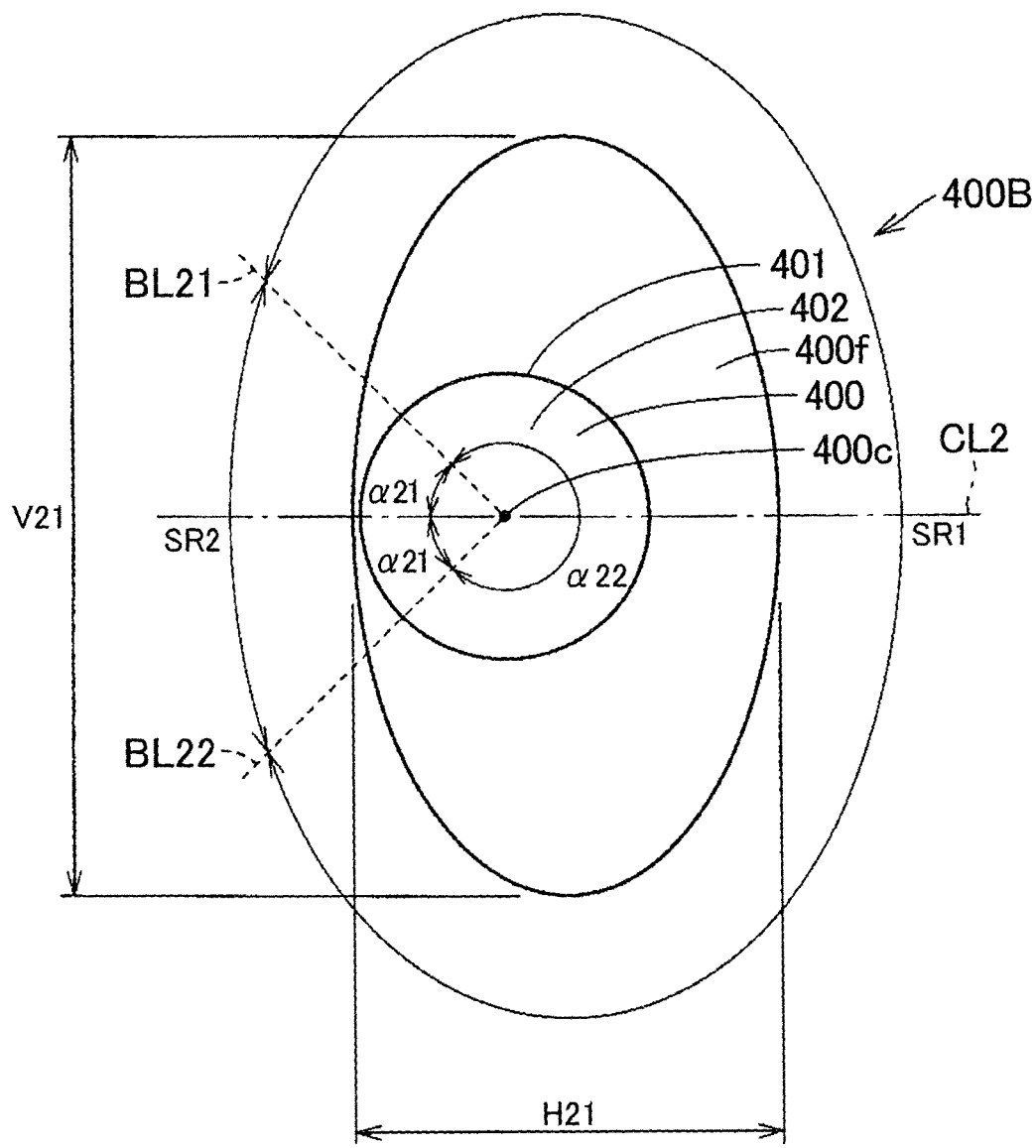
FIG. 17 is a view (plan view) that shows an example shape of a shield member according to a second embodiment.
Figure 18:
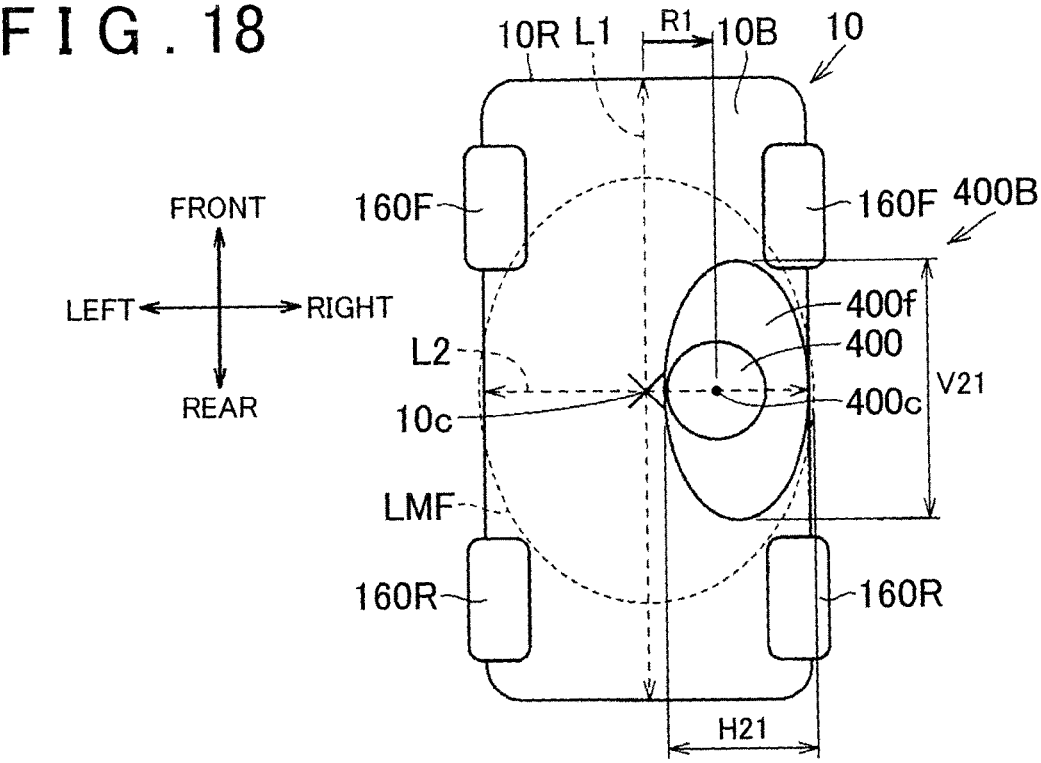
FIG. 18 is a plan view that shows an extension of a leakage electromagnetic field in the case where the shield member according to the second embodiment is mounted on the vehicle.

Next, the shape of the flange portion 400f of a shield member 400B according to a second embodiment will be described with reference to FIG. 17 and FIG. 18. FIG. 17 is a view (plan view) that shows an example shape of a shield member according to the second embodiment. FIG. 18 is a plan view that shows an extension of a leakage electromagnetic field in the case where the shield member according to the second embodiment is mounted on the vehicle.

As shown in FIG. 17, in the second embodiment, the shield member 400B includes a first shield region SR1 and a second shield region SR2 at a peripheral position that surrounds the power receiving portion 27. The first shield region SR1 has a high shielding function. The second shield region SR2 has a shielding function lower than that of the first shield region SR1.

The cylindrical portion 401 has a circular shape; whereas the shape of the flange portion 400f is formed in a substantially elliptical shape that is longer in the longitudinal direction than in the transverse direction (long side V21, short side H21). Furthermore, the cylindrical portion 401 is biased leftward, and the flange portion 400f on the right side of the cylindrical portion 401 is extended by a larger amount than the flange portion 400f on the left side of the cylindrical portion 401.

When the shield member 400B is partitioned by boundary lines BL21 and BL22 that respectively incline forward and rearward by [α21]° with respect to a center line CL2 that extends in the transverse direction of the electromotive vehicle 10, the right-side region between BL21 and BL22 is defined as the first shield region SR1, and the left-side region between BL21 and BL22 is defined as the second shield region SR2.

In the present embodiment, [α21]° is set to 45°. As a result, in FIG. 17, [α22]° becomes 270°. The partitions (angles) of the regions are just illustrative and are not limited to these partitions.

The flange portion 400f is formed in an elliptical shape that is long in the longitudinal direction, the cylindrical portion 401 is biased leftward and the flange portion 400f on the right side of the cylindrical portion 401 is extended by a larger amount than the flange portion 400f on the left side of the cylindrical portion 401. By doing, the amount of the flange portion 400f extending radially outward from the cylindrical portion 401 is set such that the extended amount of the first shield region SR1 is larger than the extended amount of the second shield region SR2. As a result, at a peripheral position that surrounds the power receiving portion 27, the first shield region SR1 has a higher shielding function than the second shield region SR2.

As shown in FIG. 18, the shield member 400B having the above shape is mounted at a position that is offset rightward by a distance R1 from the center 10c of the electromotive vehicle 10. By so doing, the shield member 400B is arranged such that the first shield region SR1 includes a position ((L2/2)–R1) having a minimum distance from the power receiving portion 27 to the outer frame (outer shape profile) 10R at the vehicle body outer side of a face on which the power receiving portion 27 is installed. That is, the short side H21 of the flange portion 400f is aligned in the transverse direction, and the long side V21 of the flange portion 400f is aligned in the longitudinal direction.

Thus, as shown in FIG. 18, the shielding effect at the center in the longitudinal direction of the electromotive vehicle 10 and adjacent to the right side is increased by the shield member 400B. By so doing, it is possible to suppress an extension of the leakage electromagnetic field LMF outward from the outer frame (outer shape profile) 10R of the under panel 10B.

On the other hand, the shielding effect of the shield member 400B at the left side is reduced, so the leakage electromagnetic field LMF at the left side is extended. However, the under panel 10B has a sufficient length in the longitudinal direction and the leftward direction, so it is possible to absorb the influence of the leakage electromagnetic field LMF using the under panel 10B as a shield member.

In this way, with the shield member 400B according to the present embodiment, when the power receiving portion 27 is mounted on the electromotive vehicle 10, it is possible to mount the shield member 400B having a shielding function that reflects the shape of the under panel 10B that is the shape of the electromotive vehicle 10. As a result, it is possible to appropriately suppress the leakage electromagnetic field, and it is possible to reduce the weight and size of the shield member 400B by optimizing the shape of the shield member 400B.

FIG. 17 and FIG. 18 illustrate the case where the shield member 400B is mounted adjacent to the right side at the center in the longitudinal direction of the electromotive vehicle 10. Instead, when a shield member is mounted adjacent to the left side at the center in the longitudinal direction of the electromotive vehicle 10, the shield member 400B may be formed in a bilaterally symmetrical shape.

Figure 19:
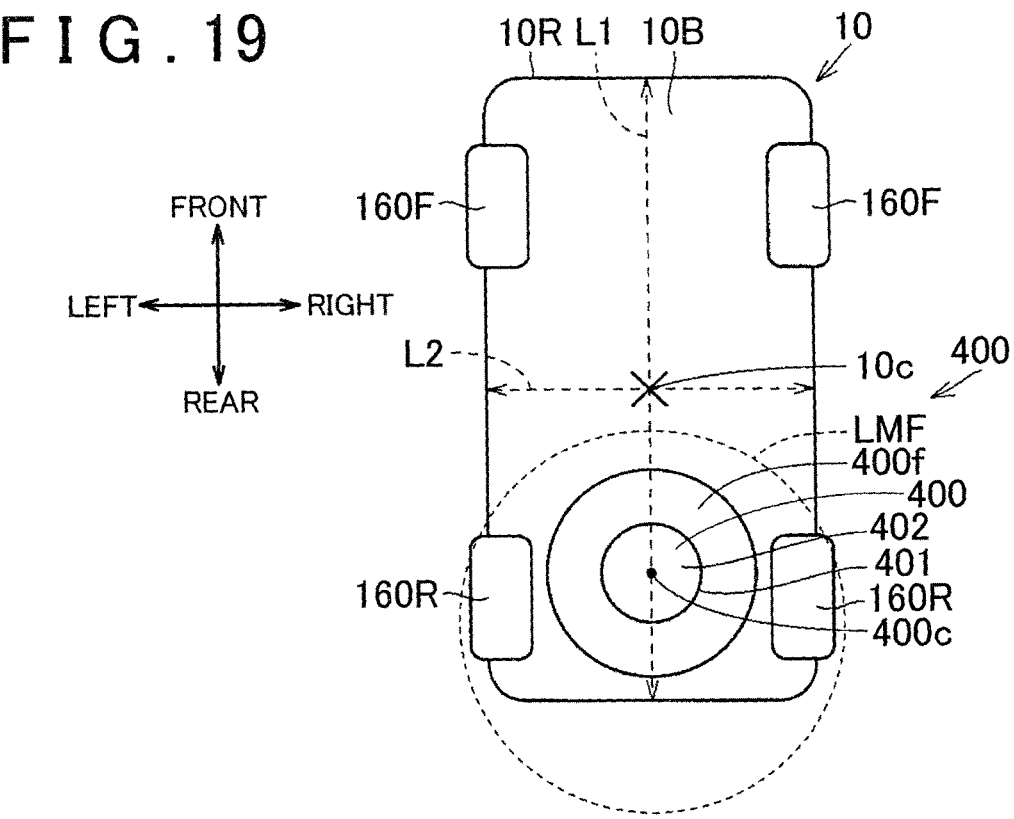
FIG. 19 is a schematic view (plan view) that shows a relationship among the shape of the vehicle, a shield member mounted at the rear portion of the vehicle and a leakage electromagnetic wave.
Figure 20:
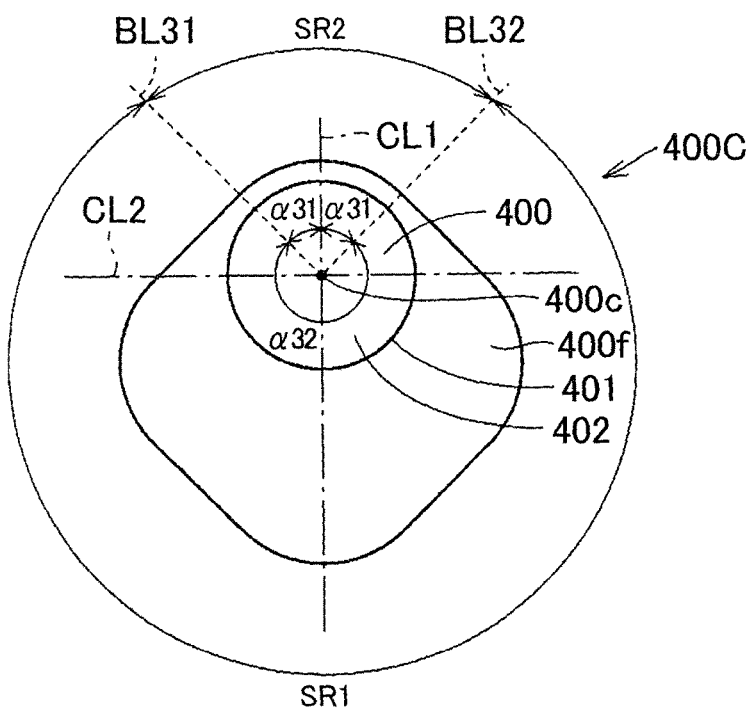
FIG. 20 is a view (plan view) that shows an example shape of a shield member according to a third embodiment.
Figure 21:
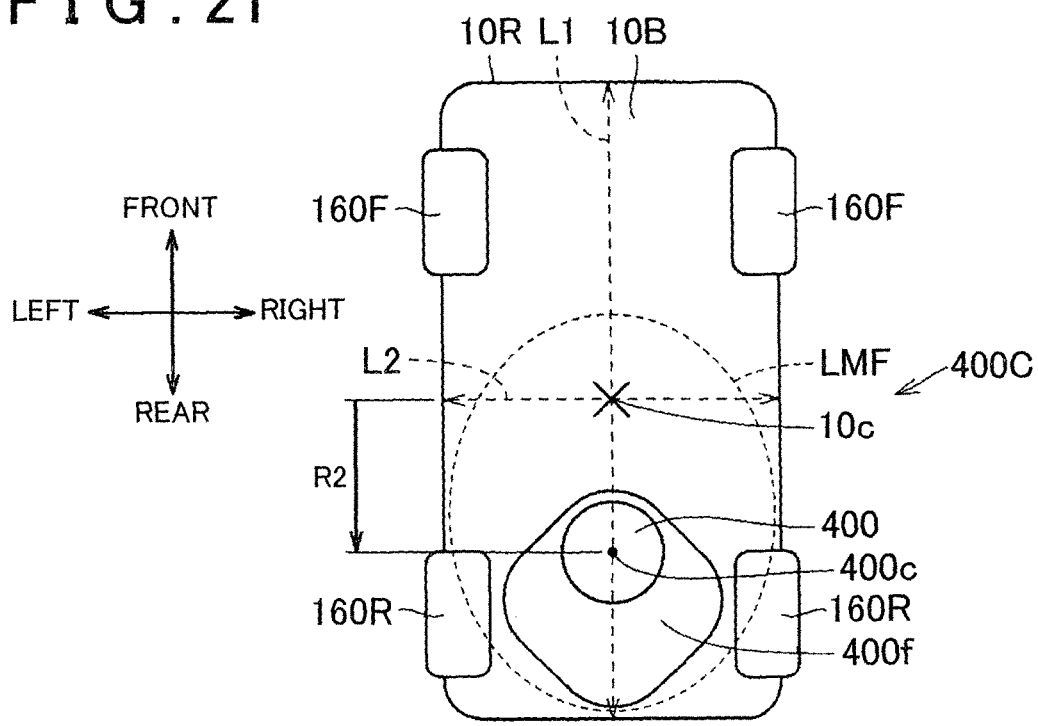
FIG. 21 is a plan view that shows an extension of a leakage electromagnetic field in the case where the shield member according to the third embodiment is mounted on the vehicle.

Next, the shape of the flange portion 400f of a shield member 400C according to a third embodiment will be described with reference to FIG. 19 to FIG. 21. FIG. 19 is a schematic view (plan view) that shows a relationship among the shape of the vehicle, the shield member mounted at the rear portion of the vehicle and a leakage electromagnetic wave. FIG. 20 is a view (plan view) that shows an example shape of the shield member according to the third embodiment. FIG. 21 is a plan view that shows an extension of a leakage electromagnetic field in the case where the shield member according to the third embodiment is mounted on the vehicle.

As shown in FIG. 19, when the circular flange portion 400f, shown in FIG. 12, is mounted at the rear portion of the vehicle, part of the leakage electromagnetic field LMF may protrude toward a rear-side region from the outer frame (outer shape profile) 10R of the under panel 10B.

As shown in FIG. 20, in the present embodiment, the shield member 400C includes a first shield region SR1 and a second shield region SR2 at a peripheral position that surrounds the power receiving portion 27. The first shield region SR1 has a high shielding function. The second shield region SR2 has a shielding function lower than that of the first shield region SR1.

The cylindrical portion 401 has a circular shape; whereas the shape of the flange portion 400*f* is formed in a square shape of which diagonal lines are respectively aligned along the transverse direction and the longitudinal direction. Note that corners of the square shape are rounded. Furthermore, the cylindrical portion 401 is biased upward, and the flange portion 400*f* on the lower side of the cylindrical portion 401 is extended by a larger amount than the flange portion 400*f* on the upper side of the cylindrical portion 401.

When the shield member 400C is partitioned by boundary lines BL31 and BL32 that respectively incline rightward and leftward by [α31]° with respect to the center line CL1 that extends in the longitudinal direction through the center 400*c* of the cylindrical portion 401, the rear-side region between BL31 and BL32 is defined as the first shield region SR1, and the front-side region between BL31 and BL32 is defined as the second shield region SR2.

In the present embodiment, [α31]° is set to 45°. As a result, in FIG. 20, [α32]° becomes 270°. The partitions (angles) of the regions are just illustrative and are not limited to these partitions.

The flange portion 400*f* is formed in a square shape of which diagonal lines are respectively aligned along the transverse direction and the longitudinal direction, the cylindrical portion 401 is biased forward and the flange portion 400*f* on the rear side of the cylindrical portion 401 is extended by a larger amount than the flange portion 400*f* on the front side of the cylindrical portion 401. By so doing, the amount of the flange portion 400*f* extending radially outward from the cylindrical portion 401 is set such that the extended amount of the first shield region SR1 is larger than the extended amount of the second shield region SR2. As a result, at a peripheral position that surrounds the power receiving portion 27, the first shield region SR1 has a higher shielding function than the second shield region SR2.

As shown in FIG. 21, the shield member 400C having the above shape is mounted at a position that is offset rearward by a distance R2 from the center 10*c* of the electromotive vehicle 10. By so doing, the shield member 400C is arranged such that the first shield region SR1 includes a position ((L1/2)−R2) having a minimum distance from the power receiving portion 27 to the outer frame (outer shape profile) 10R at the vehicle body outer side of a face on which the power receiving portion 27 is installed. That is, the diagonal lines of the flange portion 400*f* are respectively arranged along the longitudinal direction and the transverse direction.

Thus, as shown in FIG. 21, the shielding effect at the center in the transverse direction and the rear side in the longitudinal direction of the electromotive vehicle 10 is increased by the shield member 400C. By so doing, it is possible to suppress an extension of the leakage electromagnetic field LMF rearward from the outer frame (outer shape profile) 10R of the under panel 10B.

On the other hand, the shielding effect of the shield member 400C at the front side is reduced, so the leakage electromagnetic field LMF at the front side is extended. However, the under panel 10B has a sufficient length in the forward direction, so it is possible to absorb the influence of the leakage electromagnetic field LMF using the under panel 10B as a shield member.

In this way, with the shield member 400C according to the third embodiment, when the power receiving portion 27 is mounted on the electromotive vehicle 10, it is possible to mount the shield member 400C having a shielding function that reflects the shape of the under panel 10B that is the shape of the electromotive vehicle 10. As a result, it is possible to appropriately suppress the leakage electromagnetic field, and it is possible to reduce the weight and size of the shield member 400C by optimizing the shape of the shield member 400C.

FIG. 20 and FIG. 21 illustrate the case where the power receiving device 40 is mounted at the rear portion of the electromotive vehicle 10. Instead, when the power receiving device 40 is mounted at the front portion of the electromotive vehicle 10, the shield member 400C may be formed in a longitudinally symmetrical shape.

Figure 22:
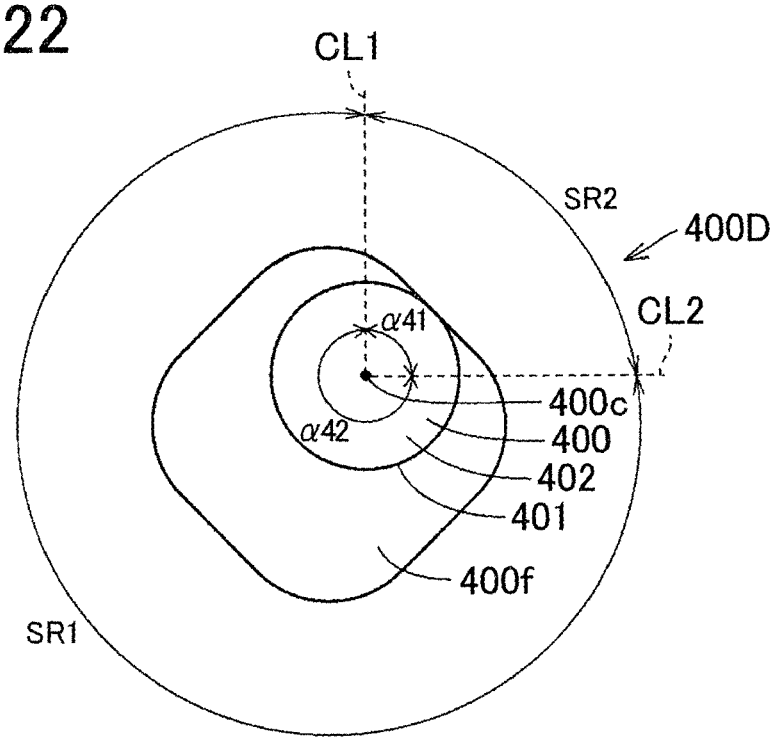
FIG. 22 is a view (plan view) that shows an example shape of a shield member according to a fourth embodiment.
Figure 23:
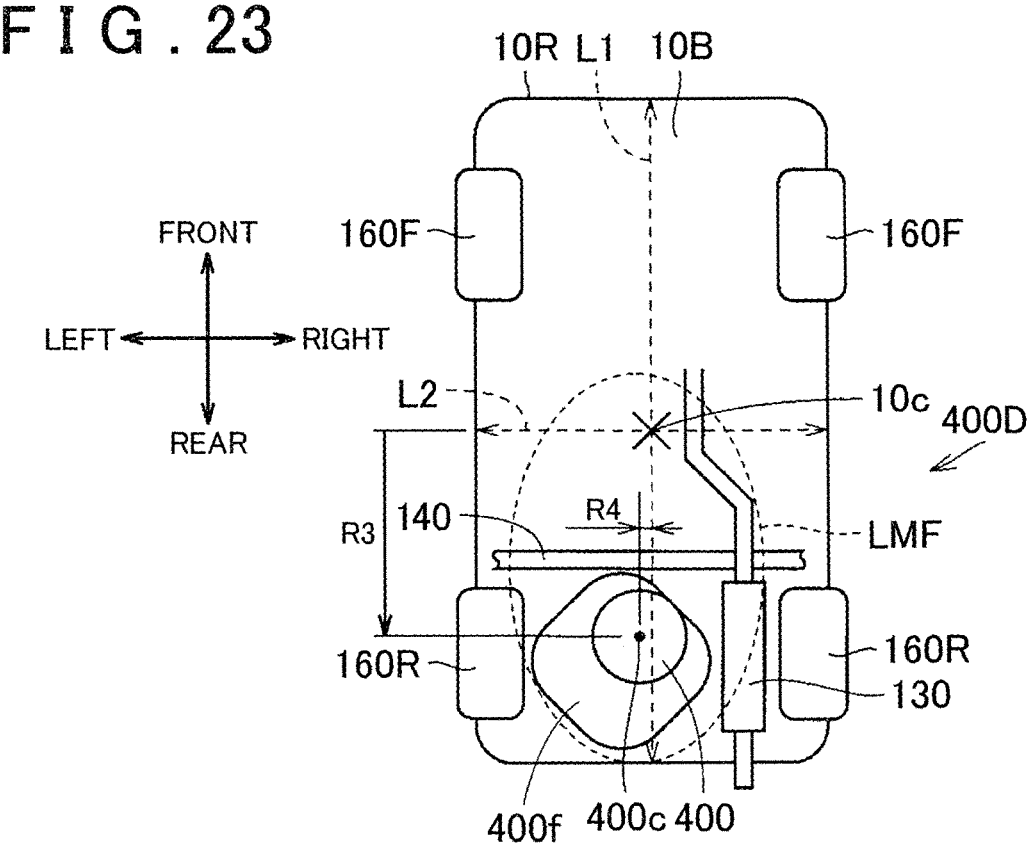
FIG. 23 is a plan view that shows an extension of a leakage electromagnetic field in the case where the shield member according to the fourth embodiment is mounted on the vehicle.

Next, the shape of the flange portion 400*f* of a shield member 400D according to a fourth embodiment will be described with reference to FIG. 22 and FIG. 23. FIG. 22 is a view (plan view) that shows an example shape of the shield member according to the fourth embodiment. FIG. 23 is a plan view that shows an extension of a leakage electromagnetic field in the case where the shield member according to the present embodiment is mounted on the vehicle.

As shown in FIG. 22, in the present embodiment, the shield member 400D includes a first shield region SR1 and a second shield region SR2 at a peripheral position that surrounds the power receiving portion 27. The first shield region SR1 has a high shielding function. The second shield region SR2 has a shielding function lower than that of the first shield region SR1.

The cylindrical portion 401 has a circular shape; whereas the shape of the flange portion 400*f* is formed in a square shape of which diagonal lines are respectively aligned along the transverse direction and the longitudinal direction. Note that corners of the square shape are rounded. Furthermore, the cylindrical portion 401 is biased forward and rightward, and the flange portion 400*f* on the rear side and left side of the cylindrical portion 401 is extended by a larger amount than the flange portion 400*f* on the front side and right side of the cylindrical portion 401.

With respect to the center line CL1 that extends in the longitudinal direction through the center 400*c* of the cylindrical portion 401 and the center line CL2 that extends in the transverse direction, the rear-left region between the center line CL1 and the center line CL2 is defined as the first shield region SR1, and the front-right region between the center line CL1 and the center line CL2 is defined as the second shield region SR2.

In the fourth embodiment, [α41]° becomes 90°, and [α42]° becomes 270°. The partitions (angles) of the regions are just illustrative and are not limited to these partitions.

The flange portion 400*f* is formed in a square shape of which diagonal lines are respectively aligned along the transverse direction and the longitudinal direction, the cylindrical portion 401 is biased forward and rightward and the flange portion 400*f* on the rear side and left side of the cylindrical portion 401 is extended by a larger amount than the flange portion 400*f* on the front side and right side of the cylindrical portion 401. By so doing, the amount of the flange portion 400*f* extending radially outward from the cylindrical portion 401 is set such that the extended amount of the first shield region SR1 is larger than the extended amount of the second shield region SR2. As a result, at a peripheral position that surrounds the power receiving portion 27, the first shield region SR1 has a higher shielding function than the second shield region SR2.

As, shown in FIG. 23, the center 400*c* of the shield member 400D having the above shape is mounted at a position that is offset rearward by a distance R3 and leftward by a distance R4 from the center 10c of the electromotive vehicle 10. Because vehicle-mounted devices, such as a muffler 130 and a suspension 140 that are mounted on the electromotive vehicle 10, have a shielding effect, the shield member 400D is arranged such that the second shield region SR2 having a low shielding function faces the muffler 130 and the suspension 140.

By so doing, the shield member 400D is arranged such that the first shield region SR1 includes a position ((L1/2)–R3) having a minimum distance from the power receiving portion 27 to the outer frame (outer shape profile) 10R at the vehicle body outer side of a face on which the power receiving portion 27 is installed. That is, the diagonal lines of the flange portion 400f are respectively arranged along the longitudinal direction and the transverse direction.

Thus, as shown in FIG. 23, the shielding effect at the left side in the transverse direction and the rear side in the longitudinal direction of the electromotive vehicle 10 is increased by the shield member 400D. By so doing, it is possible to suppress an extension of the leakage electromagnetic field LMF rearward from the outer frame (outer shape profile) 10R of the under panel 10B.

On the other hand, the shielding effect of the shield member 400D at the front side and the right side is reduced, so the leakage electromagnetic field LMF at the front side is extended. However, the under panel 10B has a sufficient length in the front-side direction, so it is possible to absorb the influence of the leakage electromagnetic field LMF using the under panel 10B as a shield member. In addition, it is possible to absorb the influence of the leakage electromagnetic field LMF with the vehicle-mounted devices, such as the muffler 130 and, the suspension 140.

In this way, with the shield member 400D according to the present embodiment, when the power receiving portion 27 is mounted on the electromotive vehicle 10, it is possible to mount the shield member 400D having a shielding function that reflects the shape of the under panel 10B that is the shape of the electromotive vehicle 10 and the shape of each vehicle-mounted device. As a result, it is possible to appropriately suppress the leakage electromagnetic field, and it is possible to reduce the weight and size of the shield member 400D by optimizing the shape of the shield member 400D.

When a position at which the muffler 130 is mounted on the electromotive vehicle 10 and the position described in the present embodiment are bilaterally symmetrical, the shape and mounting position of the shield member 400D and the above-described shape and mounting position also just need to be bilaterally symmetrical.

Figure 24:
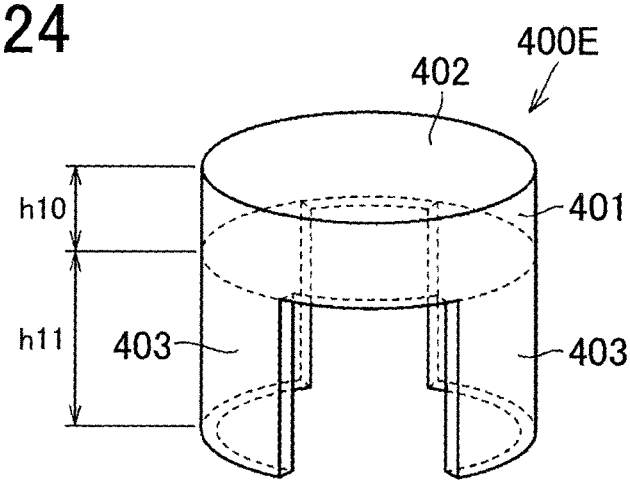
FIG. 24 is a perspective view that shows an example shape of a shield member according to a fifth embodiment.
Figure 25:
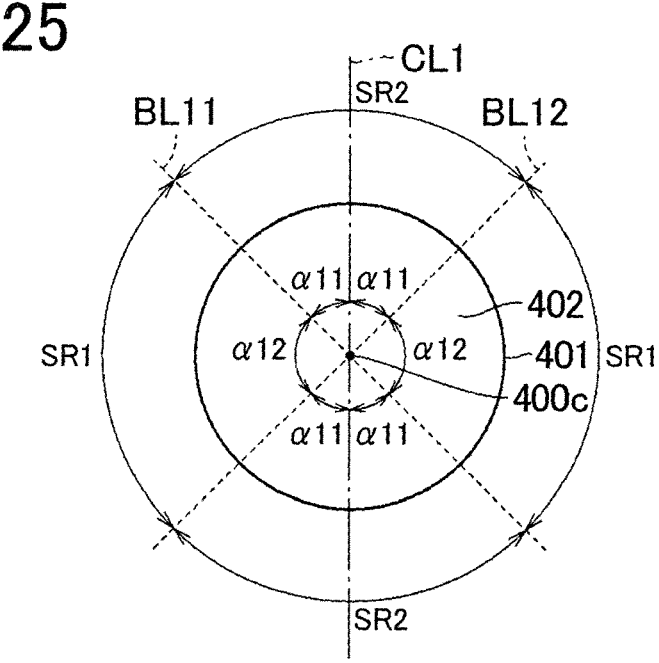
FIG. 25 is a plan view that shows the example shape of the shield member according to the fifth embodiment.

Next, the shape of the flange portion 400f of a shield member 400E according to a fifth embodiment will be described with reference to FIG. 24 and FIG. 25. FIG. 24 is a perspective view that shows an example shape of the shield member according to the fifth embodiment. FIG. 25 is a plan view that shows the example shape of the shield member according to the present embodiment.

In the above-described embodiments, the description is made on the case where the flange portion 400f that extends radially outward in order to form the first shield region SR1 having a high shielding function and the second shield region SR2 having a shielding function lower than that of the first shield region SR1.

In the fifth embodiment, instead of the flange portion that extends radially outward, the axial length (the vertical length when mounted on the electromotive vehicle 10) of the cylindrical portion 401 is varied between the first shield regions SR1 and the second shield regions SR2. The shield member 400E according to the present embodiment has the same shielding function as the shield member 400A according to the first embodiment shown in FIG. 15. Hereinafter, the structure of the shield member 400E will be described.

As shown in FIG. 24 and FIG. 25, in the present embodiment, the shield member 400E includes the first shield regions SR1 and the second shield regions SR2 at a peripheral position that surrounds the power receiving portion 27. The first shield regions SR1 have a high shielding function. The second shield regions SR2 have a shielding function lower than that of each first shield region SR1.

The cylindrical portion 401 has a circular shape, and has a height of h10 in the axial direction (vertical direction). When the shield member 400E is partitioned by the boundary lines BL11 and BL12 that respectively incline rightward and leftward by [α11]° with respect to the center line CL1 that extends in the longitudinal direction of the electromotive vehicle 10, the regions located in the transverse direction each are defined as the first shield region SR1, and the regions located in the longitudinal direction each are defined as the second shield region SR2.

In the fifth embodiment, [α11]° is set to 45°. As a result, in FIG. 25, [α12]° becomes 90°. The partitions (angles) of the regions are just illustrative and are not limited to these partitions.

The axial (vertical) height of the cylindrical portion 401 is h10 in the second shield regions SR2; whereas extended portions 403 having a height of h11 are respectively provided in the first shield regions SR1. By so doing, the amount of the shield member in each first shield region SR1 is larger than the amount of the shield member in each second shield region SR2. As a result, at a peripheral position that surrounds the power receiving portion 27, each first shield region SR1 has a higher shielding function than each second shield region SR2.

By mounting the shield member 400E having the above shape such that the center 10c of the electromotive vehicle 10 coincides with the center 400c of the shield member 400E as shown in FIG. 16, it is possible to obtain similar operation and advantageous effect to those of the shield member 400A according to the first embodiment.

The shield member 400E according to the fifth embodiment may be applied to the shield members according to the above-described first to fourth embodiments.

Figure 26:
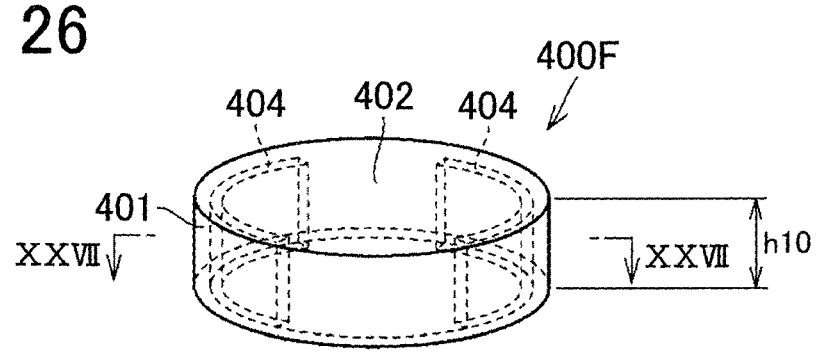
FIG. 26 is a perspective view that shows an example shape of a shield member according to a sixth embodiment.
Figure 27:
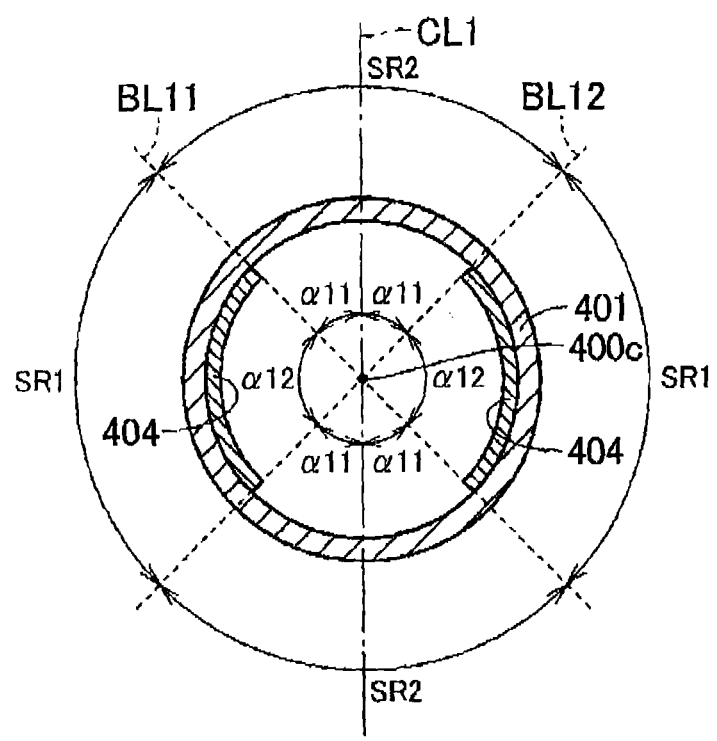
FIG. 27 is a cross-sectional view taken along the line XXVII-XXVII in FIG. 26.

Next, the shape of a shield member 400F according to a sixth embodiment will be described with reference to FIG. 26 and FIG. 27. FIG. 26 is a perspective view that shows an example shape of the shield member according to the sixth embodiment. FIG. 27 is a cross-sectional view taken along the line XXVII-XXVII in FIG. 26.

In the above-described first to fourth embodiments, the description is made on the case where the flange portion 400f that extends radially outward in order to form the first shield region SR1 having a high shielding function and the second shield region SR2 having a shielding function lower than that of the first shield region SR1.

In the present embodiment, instead of the flange portion that extends radially outward, a shielding function is varied in the cylindrical portion 401 between the first shield regions SR1 and the second shield regions SR2. The shield member 400F according to the present embodiment has the same shielding function as the shield member 400A according to the first embodiment shown in FIG. 15. Hereinafter, the structure of the shield member 400F will be described.

As shown in FIG. 26 and FIG. 27, in the present embodiment, the shield member 400F includes the first shield regions SR1 and the second shield regions SR2 at a peripheral position that surrounds the power receiving portion 27. The first shield regions SR1 have a high shielding function. The second shield regions SR2 have a shielding function lower than that of each first shield region SR1.

The cylindrical portion 401 has a circular shape, and has a height of h10 in the axial direction (vertical direction). When the shield member 400F is partitioned by the boundary lines BL11 and BL12 that respectively incline rightward and leftward by [α11]° with respect to the center line CL1 that extends in the longitudinal direction of the electromotive vehicle 10, the regions located in the transverse direction each are defined as the first shield region SR1, and the regions located in the longitudinal direction each are defined as the second shield region SR2.

In the present embodiment, [α11]° is set to 45°. As a result, in FIG. 27, [α12]° becomes 90°. The partitions (angles) of the regions are just illustrative and are not limited to these partitions.

Members 404 having a shielding function are respectively stuck to the inner sides of the cylindrical portion 401, which are respectively located in the first shield regions SR1. By so doing, at a peripheral position that surrounds the power receiving portion 27, each first shield region SR1 has a higher shielding function than each second shield region SR2.

By mounting the shield member 400F having the above shape such that the center 10c of the electromotive vehicle 10 coincides with the center 400c of the shield member 400E as shown in FIG. 16, it is possible to obtain similar operation and advantageous effect to those of the shield member 400A according to the first embodiment.

Note that the members 404 may be stuck to the outer sides of the cylindrical portion 401. Instead of sticking the members 404, the material of the cylindrical portion 401 may be varied between the first shield regions SR1 and the second shield regions SR2.

The shield member 400F according to the sixth embodiment may be applied to the shield members according to the above-described first to fifth embodiments.

The vehicle according to the above-described embodiments includes the power receiving portion that contactlessly receives electric power from the power transmitting portion provided outside the vehicle, and includes the shield member that is arranged around the power receiving portion in the same plane as a plane in which the power receiving portion is arranged, wherein the shield member includes the first shield region having a high shielding function and the second shield region having a shielding function lower than that of the first shield region at a position around the power receiving portion.

In mounting the shield member on the vehicle, as described in the above embodiments, the first shield region having a high shielding function is arranged so as to include a region in which a shielding function of the vehicle is low on the basis of the shape of the vehicle, and the second shield region having a low shielding function is arranged so as to include a region in which the shielding function of the vehicle is high.

By so doing, when the power receiving portion is mounted on the vehicle, it is possible to provide the vehicle on which the shield member having a shielding function that reflects the shape of the vehicle is mounted.

In the above-described embodiments, the power receiving device that includes the electromagnetic induction coil 12 and the power transmitting device that includes the electromagnetic induction coil 23 are illustrated. Instead, the invention is also applicable to a contactless resonance power transmitting and receiving system that does not include electromagnetic induction coils.

Specifically, at the power transmitting device 41 side, a power supply unit (the alternating-current power supply 21 and the high-frequency power driver 22) may be directly connected to the resonance coil 24 without providing the electromagnetic induction coil 23. At the power receiving device 40 side, the rectifier 13 may be directly connected to the resonance coil 11 without providing the electromagnetic induction coil 12.

Figure 28:
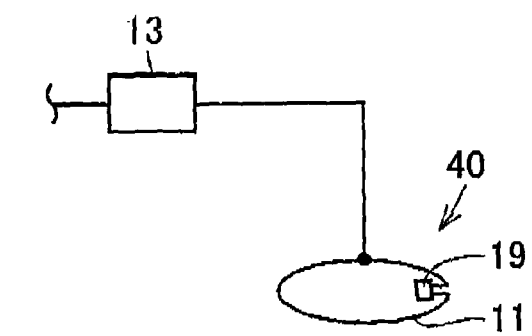
FIG. 28 is a view that shows a power transfer system according to an alternative embodiment of the invention.
Figure 28:
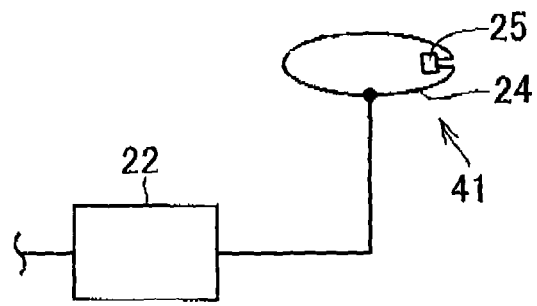

FIG. 28 shows the power transmitting device 41 that does not include the electromagnetic induction coil 23 and the power receiving device 40 that does not include the electromagnetic induction coil 12, which are based on the structure shown in FIG. 1. The power transmitting device 41 and the power receiving device 40 that are shown in FIG. 28 are applicable to the above-described all embodiments.

The embodiments described above are illustrative and not restrictive in all respects. The scope of the invention is defined by not the above description but the appended claims. The scope of the invention is intended to encompass all modifications within the scope of the appended claims and equivalents thereof.

The invention claimed is:

1. A vehicle comprising:
a power receiving portion that contactlessly receives electric power from a power transmitting portion provided outside the vehicle; and
a shield member that is arranged around the power receiving portion in the same plane as a plane in which the power receiving portion is arranged, wherein the shield member includes a first shield region having a high shielding function and a second shield region having a shielding function lower than that of the first shield region which are located at a position that surrounds the power receiving portion, wherein
the vehicle has a vehicle long-side direction and a vehicle short-side direction perpendicular to the vehicle long-side direction in plan view in a state where the vehicle is stopped in a horizontal plane, and
the first shield region of the shield member is arranged in the vehicle short-side direction with respect to the power receiving portion and the second shield region of the shield member is arranged in the vehicle long-side direction with respect to the power receiving portion.

2. The vehicle according to claim 1, wherein
the shield member includes a center portion and a flange portion disposed around the center portion so as to integrally extend radially outward from the center portion,
the flange portion includes the first shield region and the second shield region, and
a radial length of the first shield region of the flange portion is larger than a radial length of the second shield region of the flange portion, as measured from a center point of the center portion.

3. The vehicle according to claim 1, wherein
the shield member includes a cylindrical portion and a flange portion integrally extended axially from the cylindrical portion,
the flange portion includes the first shield region and the second shield region, and
an axial length of the first shield region of the flange portion is larger than an axial length of the second shield region of the flange portion.

4. The vehicle according to claim 1, wherein the shield member includes a cylindrical portion, and members having a shielding function are adhered to inner sides of the cylindrical portion at the first shield region.

5. The vehicle according to claim 1, wherein the shield member is partitioned by boundary lines forming four quadrants and the first shield region and the second shield region are disposed in alternating ones of the four quadrants.

6. The vehicle according to claim 1, wherein the vehicle includes a vehicle-mounted device, and the shield member is arranged such that the vehicle-mounted device faces the second shield region.

7. The vehicle according to claim 1, wherein the power receiving portion is mounted on a lower side of an under body of the vehicle.

8. The vehicle according to claim 1, wherein a difference between a natural frequency of the power transmitting portion and a natural frequency of the power receiving portion is smaller than or equal to 10% of the natural frequency of the power receiving portion.

9. The vehicle according to claim 1, wherein a coupling coefficient between the power receiving portion and the power transmitting portion is smaller than or equal to 0.1.

10. The vehicle according to claim 1, wherein the power receiving portion receives electric power from the power transmitting portion through at least one of a magnetic field that is formed between the power receiving portion and the power transmitting portion and that oscillates at a predetermined frequency and an electric field that is formed between the power receiving portion and the power transmitting portion and that oscillates at the predetermined frequency.

11. A vehicle comprising:
a power receiving portion that contactlessly receives electric power from a power transmitting portion provided outside the vehicle; and
a shield member that is arranged around the power receiving portion in the same plane as a plane in which the power receiving portion is arranged, wherein the shield member includes a first shield region having a high shielding function and a second shield region having a shielding function lower than that of the first shield region which are located at a position that surrounds the power receiving portion,
the shield member is arranged such that the first shield region includes a position having a minimum distance from the power receiving portion to an outer frame at a vehicle body outer side of a face on which the power receiving portion is installed.

12. The vehicle according to claim 11, wherein the shield member includes a center portion and a flange portion disposed around the center portion so as to integrally extend radially outward from the center portion,
the flange portion includes the first shield region and the second shield region, and
a radial length of the first shield region of the flange portion is larger than a radial length of the second shield region of the flange portion, as measured from a center point of the center portion.

13. The vehicle according to claim 11, wherein the shield member includes a cylindrical portion and a flange portion integrally extended axially from the cylindrical portion,
the flange portion includes the first shield region and the second shield region, and
an axial length of the first shield region of the flange portion is larger than an axial length of the second shield region of the flange portion.

14. The vehicle according to claim 11, wherein the shield member includes a cylindrical portion, and members having a shielding function are adhered to inner sides of the cylindrical portion at the first shield region.

15. The vehicle according to claim 11, wherein the shield member is partitioned by boundary lines forming four quadrants and the first shield region and the second shield region are disposed in alternating ones of the four quadrants.

16. The vehicle according to claim 11, wherein the vehicle includes a vehicle-mounted device, and the shield member is arranged such that the vehicle-mounted device faces the second shield region.

17. The vehicle according to claim 11, wherein the power receiving portion is mounted on a lower side of an under body of the vehicle.

18. The vehicle according to claim 11, wherein a difference between a natural frequency of the power transmitting portion and a natural frequency of the power receiving portion is smaller than or equal to 10% of the natural frequency of the power receiving portion.

19. The vehicle according to claim 11, wherein a coupling coefficient between the power receiving portion and the power transmitting portion is smaller than or equal to 0.1.

20. The vehicle according to claim 11, wherein the power receiving portion receives electric power from the power transmitting portion through at least one of a magnetic field that is formed between the power receiving portion and the power transmitting portion and that oscillates at a predetermined frequency and an electric field that is formed between the power receiving portion and the power transmitting portion and that oscillates at the predetermined frequency.

21. The vehicle according to claim 16, wherein the vehicle-mounted device is a muffler.

22. The vehicle according to claim 16, wherein the vehicle-mounted device is a suspension.

* * * * *